June 20, 1961  A. H. DICKINSON  2,989,181
AUTOMATIC SORTING MACHINE
Filed Dec. 30, 1955  16 Sheets-Sheet 1

INVENTOR.
ARTHUR H. DICKINSON
BY
AGENT

INVENTOR.
ARTHUR H. DICKINSON
BY
AGENT

INVENTOR.
ARTHUR H. DICKINSON
AGENT

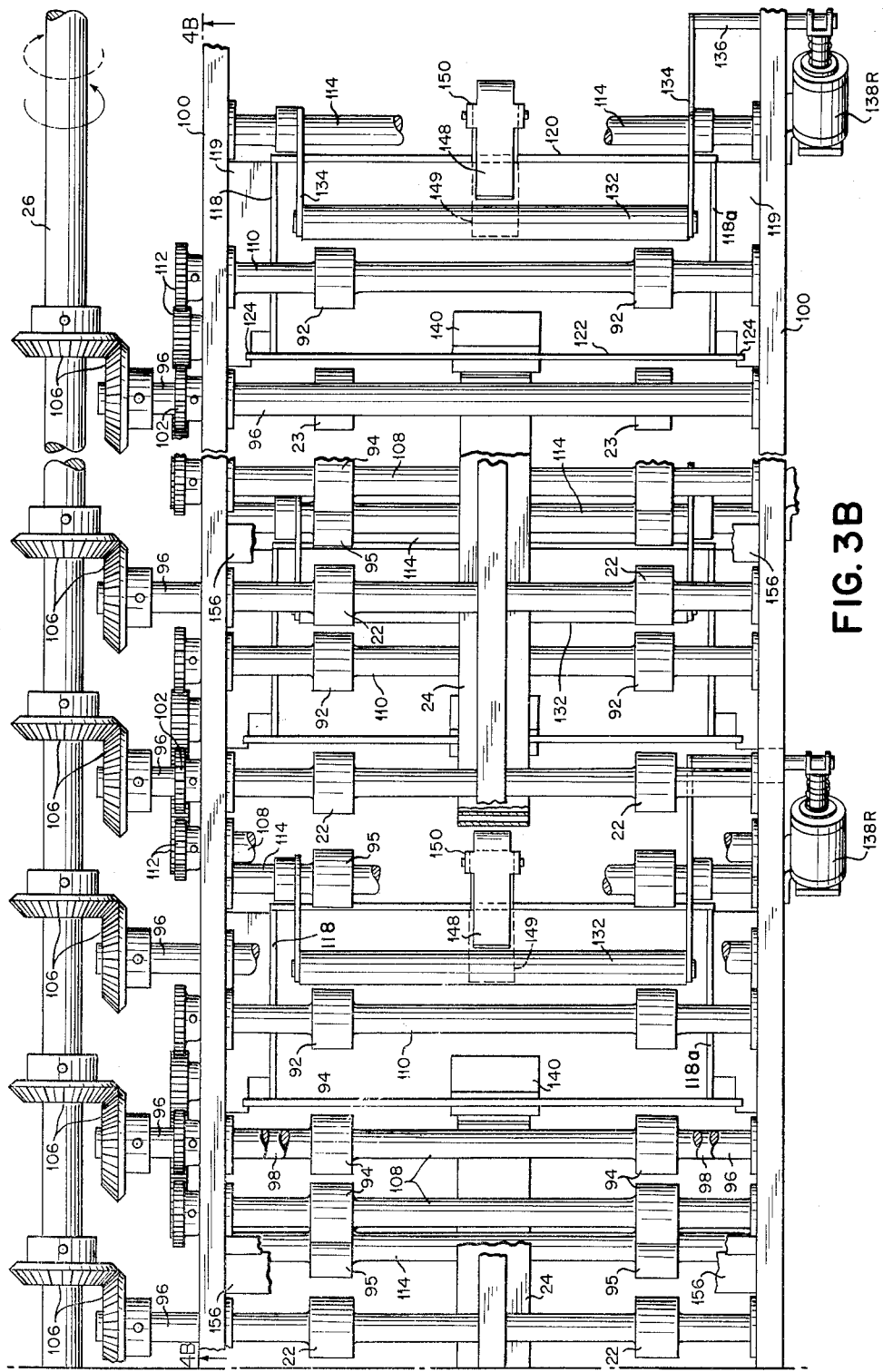

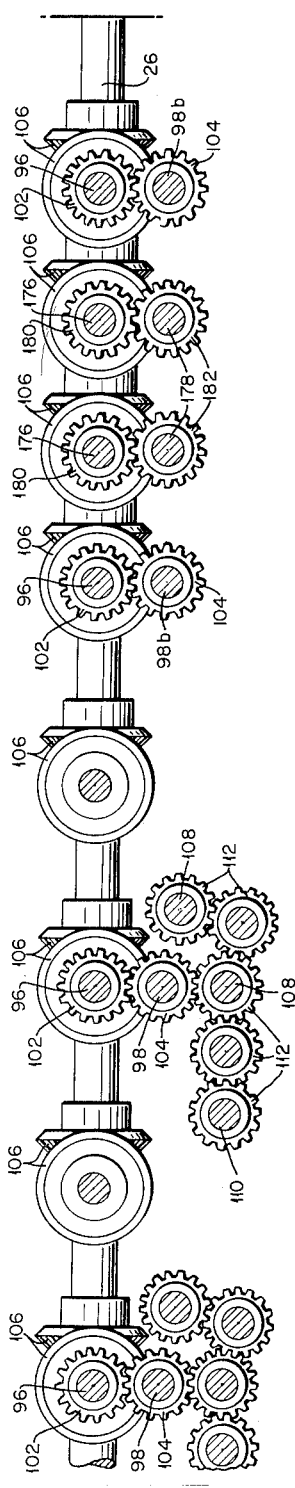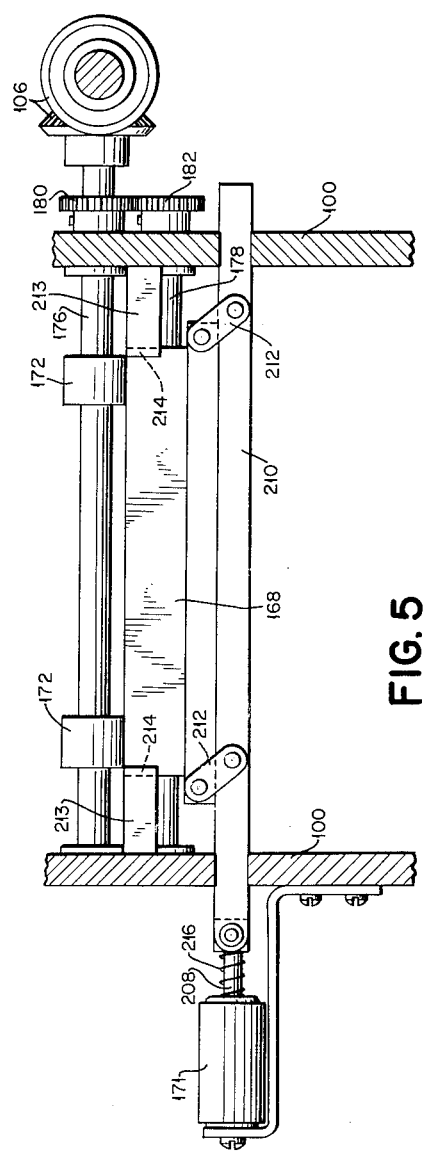

June 20, 1961  A. H. DICKINSON  2,989,181
AUTOMATIC SORTING MACHINE
Filed Dec. 30, 1955  16 Sheets-Sheet 7

INVENTOR.
ARTHUR H. DICKINSON
BY
AGENT

June 20, 1961  A. H. DICKINSON  2,989,181
AUTOMATIC SORTING MACHINE
Filed Dec. 30, 1955  16 Sheets-Sheet 9

*INVENTOR.*
ARTHUR H. DICKINSON
BY John E. Daugherty Jr.

AGENT

June 20, 1961 A. H. DICKINSON 2,989,181
AUTOMATIC SORTING MACHINE
Filed Dec. 30, 1955 16 Sheets-Sheet 11

INVENTOR.
ARTHUR H. DICKINSON
BY John E. Dougherty Jr.
AGENT

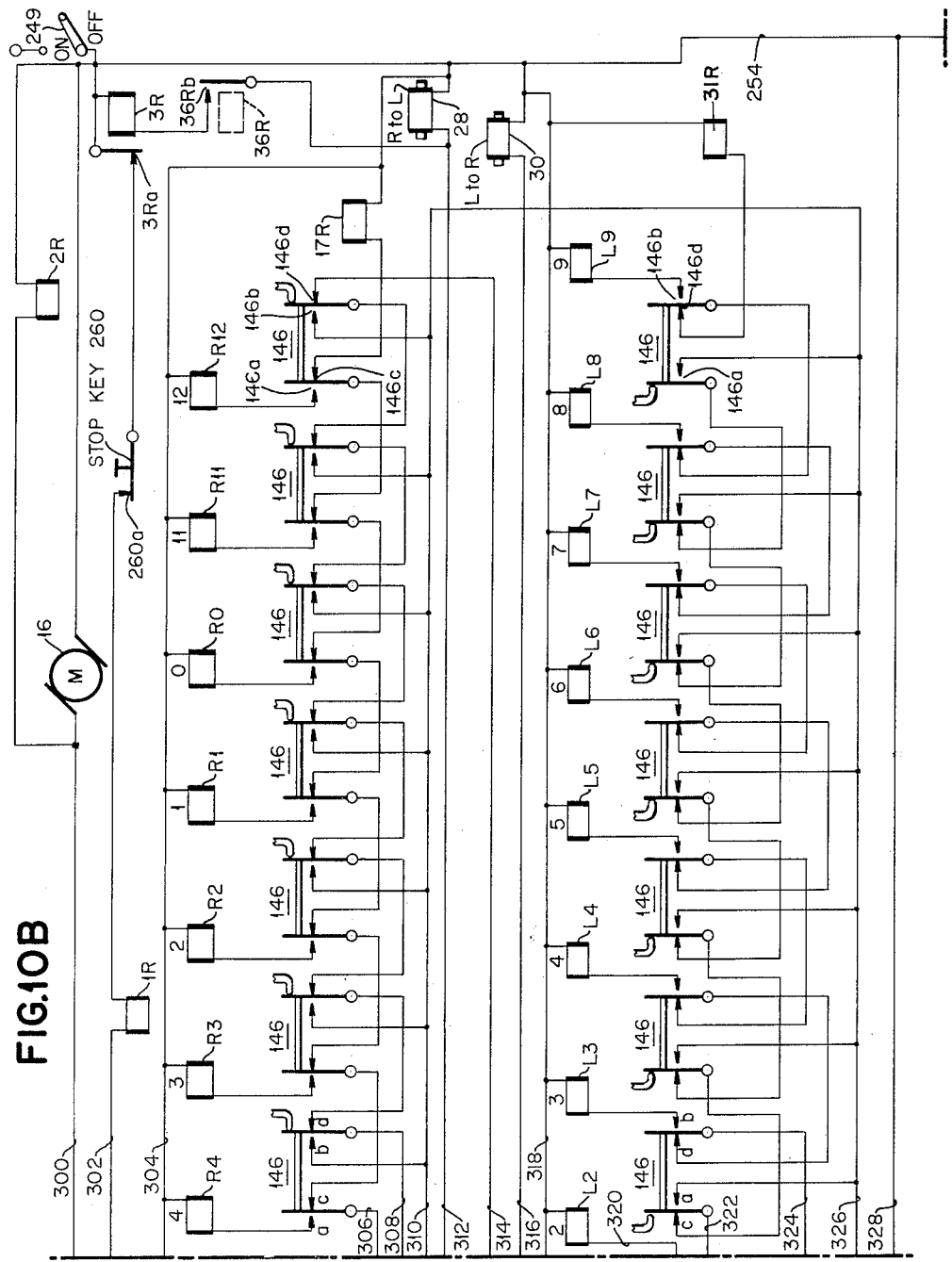

June 20, 1961

A. H. DICKINSON 2,989,181

AUTOMATIC SORTING MACHINE

Filed Dec. 30, 1955

INVENTOR.
ARTHUR H. DICKINSON

BY
John E. Dougherty Jr.

AGENT

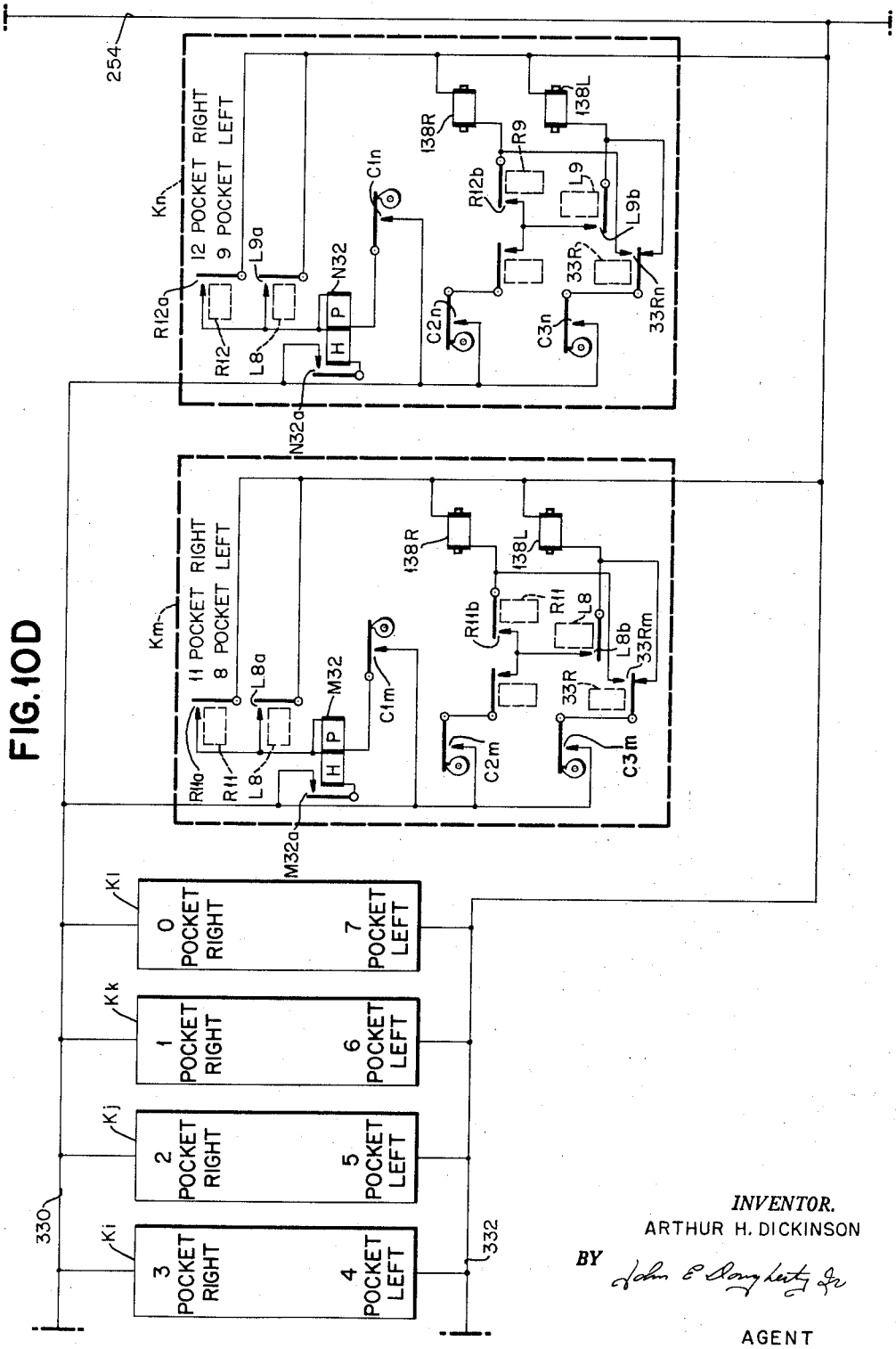

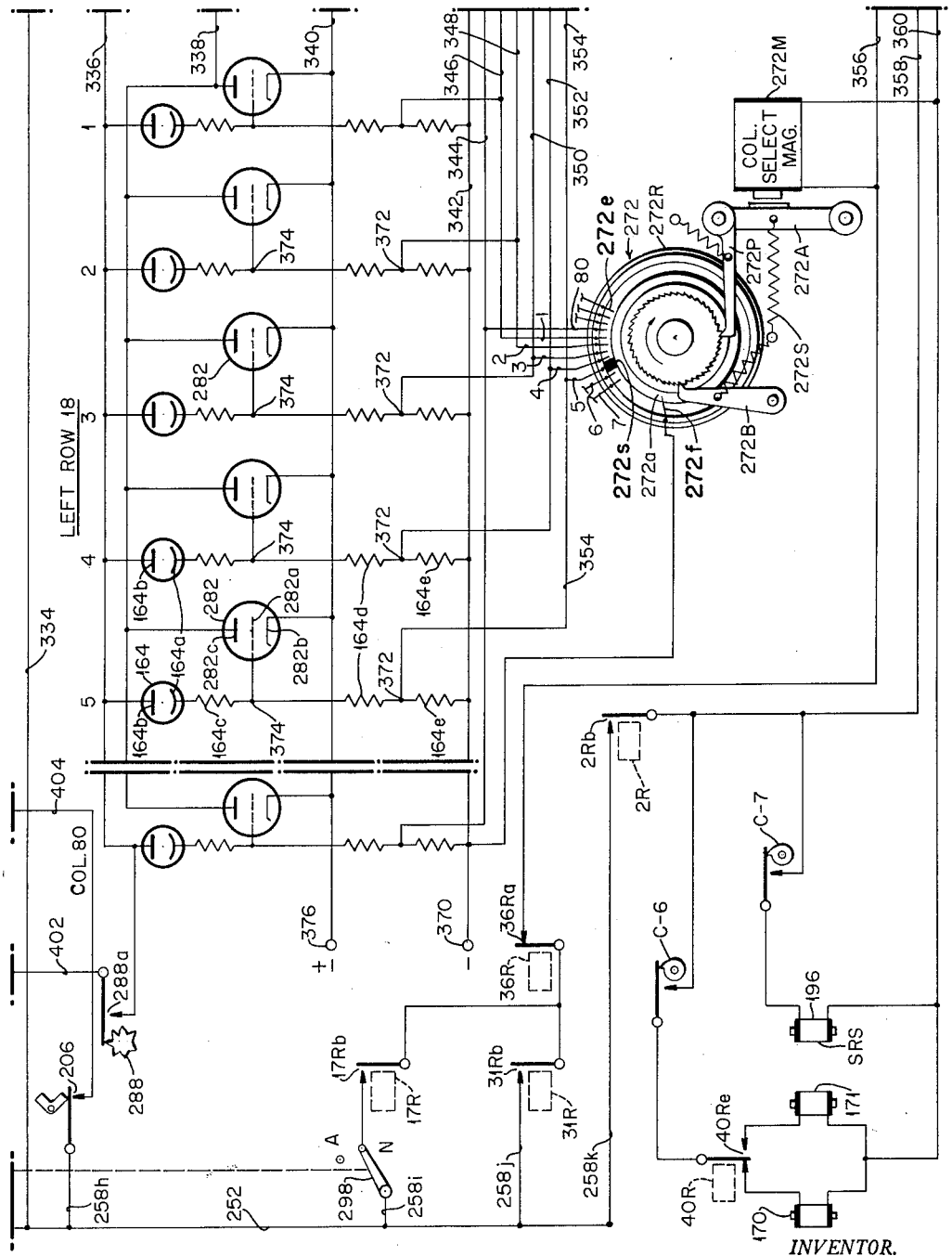

June 20, 1961

A. H. DICKINSON 2,989,181

AUTOMATIC SORTING MACHINE

Filed Dec. 30, 1955

INVENTOR.
ARTHUR H. DICKINSON
BY John E. Dougherty Jr.

AGENT

United States Patent Office 2,989,181
Patented June 20, 1961

2,989,181
AUTOMATIC SORTING MACHINE
Arthur H. Dickinson, Greenwich, Conn., assignor to International Business Machines Corporation, New York, N.Y., a corporation of New York
Filed Dec. 30, 1955, Ser. No. 556,502
13 Claims. (Cl. 209—111)

The present invention relates to a record card machine and more particularly to an improved fully automatic sorting machine for arranging groups of cards bearing single or multi-order identifying data in sequential order.

In order to fully realize the advantages attendant the application of record card equipment to accounting problems it is usually necessary that each installation include a machine which is operable to arrange groups of cards in sequenttial order. Two of the principal requirements of such a machine are speed and the ability to complete a sorting operation with a minimum of manual card handling. A machine which illustrates the basic principles of operation of many present day sorting machines is disclosed in Patent No. 1,741,985, issued on December 31, 1929 to E. A. Ford. Such machines, of course, may differ in their design according to the type of record card used, and the manner of recording thereon. For example, the well-known IBM type record card includes 80 columns spaced across its length, each of which contains 12 index point positions spaced across the width of the card. Each column of the card is representative of a single order of information, a particularl group of columns being usually designated to represent a data field. Sorting is presently accomplished by a machine having a single input hopper, an output pocket for each index position and a reject pocket. A single position sensing station is provided and in order to arrange the cards in sequence according to a multi-order field, it is necessary to run the cards through the machine at least once for each column of the field. Between successive runs of the machine it is necessary that the operator manually remove the cards from the output stackers and reload them into the supply hopper. Such a procedure, of course, demands the attention of the operator a large part of the time.

The principal object of the present invention is to provide a machine which is fully automatic, and which once supplied with cards to be sorted, is effective without further manual intervention to arrange the cards in the desired sequence.

A further object is to provide a fully automatic sorting machine wherein all movement of the cards is a direct part of the sorting operation, there being no necessity of mechanically or manually reloading the machine between successive runs of the cards.

As is illustrated by the prferred embodiment herein disclosed, these objects are carried out by providing a machine having a sensing station located between two similar rows of card pockets or receptacles. Cards to be sorted are initially placed in the machine in random fashion in the receptacles on one side of the sensing station. The card sensing means, which here are photoelectric in nature, are set to be responsive to the indicia in the column representing the lowest order of the field to be sorted and machine operation is begun. The structure of the card pockets, or receptacles, is such that cards placed in the pockets may be fed individually therefrom, the pocket nearest the sensing station being first exhausted and then those following in succession. Each card is fed past the sensing station, at which the indicia thereon is sensed and chute blades actuated accordingly to direct the sensed card into the proper pocket on the other side of the sensing station. When all of the cards originally placed in the machine have been sensed and directed to their proper pockets on the other side of the sensing station, the machine drive is automatically reversed and a like procedure is initiated to feed the cards from these pockets past the sensing station into the original group of pockets. If the field being sorted is alphabetic, the sensing means during this second pass of the cards is controlled to be responsive to the same column since two passes of the card for each column of the field are required for alphabetic sorting. If the field being sorted is numeric, then one sort per column is sufficient and the sensing means are controllable to be responsive to the next higher column of the field for each successive run from one group of pockets past the sensing station to the other group of pockets. This back and forth operation continues until the sort has been completed for the highest order column of the field at which time the cards may be removed from the machine in the desired sequential order.

A feature of the invention lies in the provision of a machine operable to selectively transfer cards back and forth between a plurality of card pockets.

Other objects of the invention will be pointed out in the following description and claims and illustrated in the accompanying drawings, which disclose, by way of example, the principle of the invention and the best mode, which has been contemplated, of applying the principle.

Figure 2A:
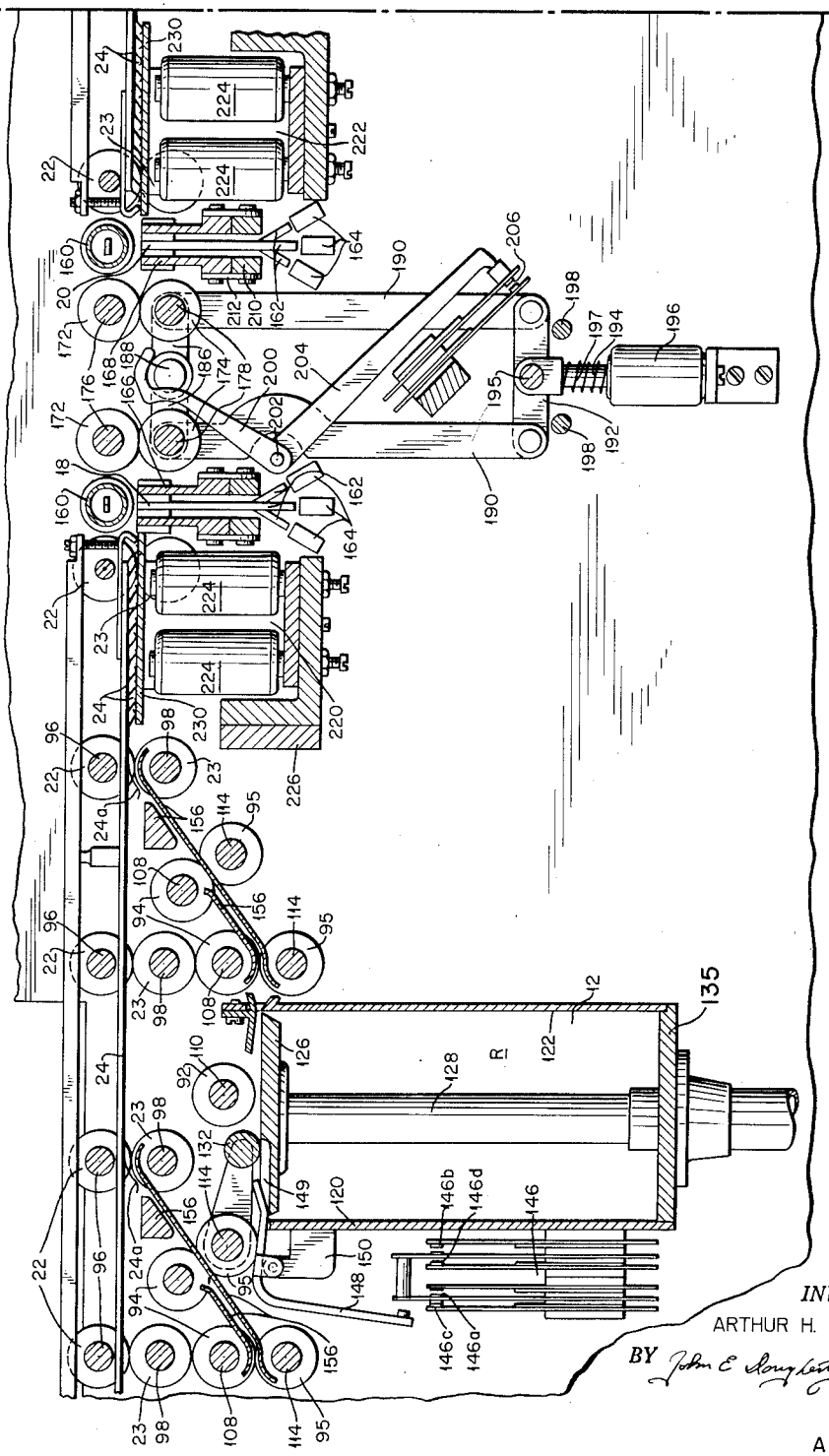
Figure 2B:
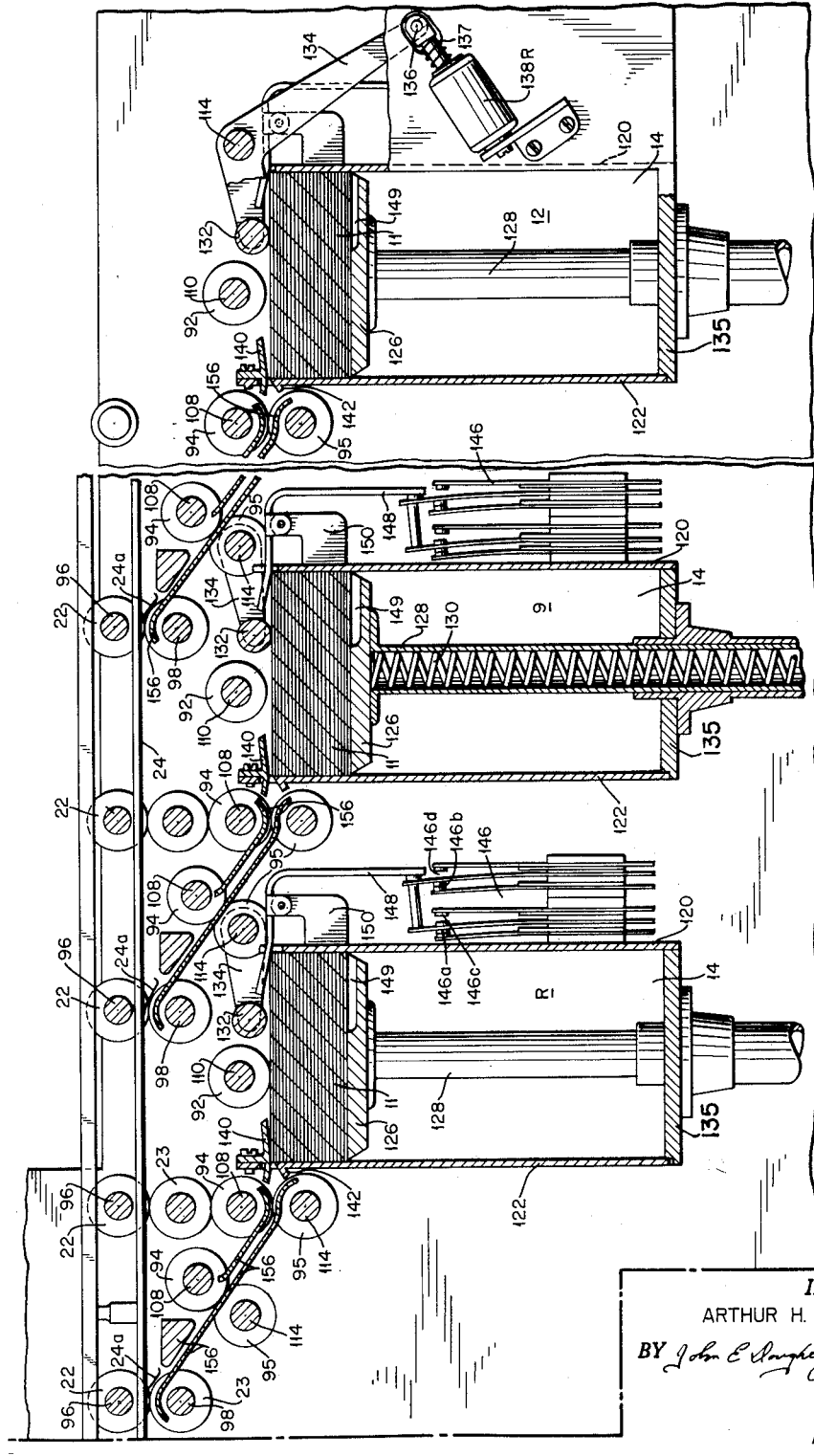

FIGS. 2A and 2B taken together constitute a sectional elevation taken through the center of the machine and shows in detail certain of the card pockets of the machine.

Figure 3A:
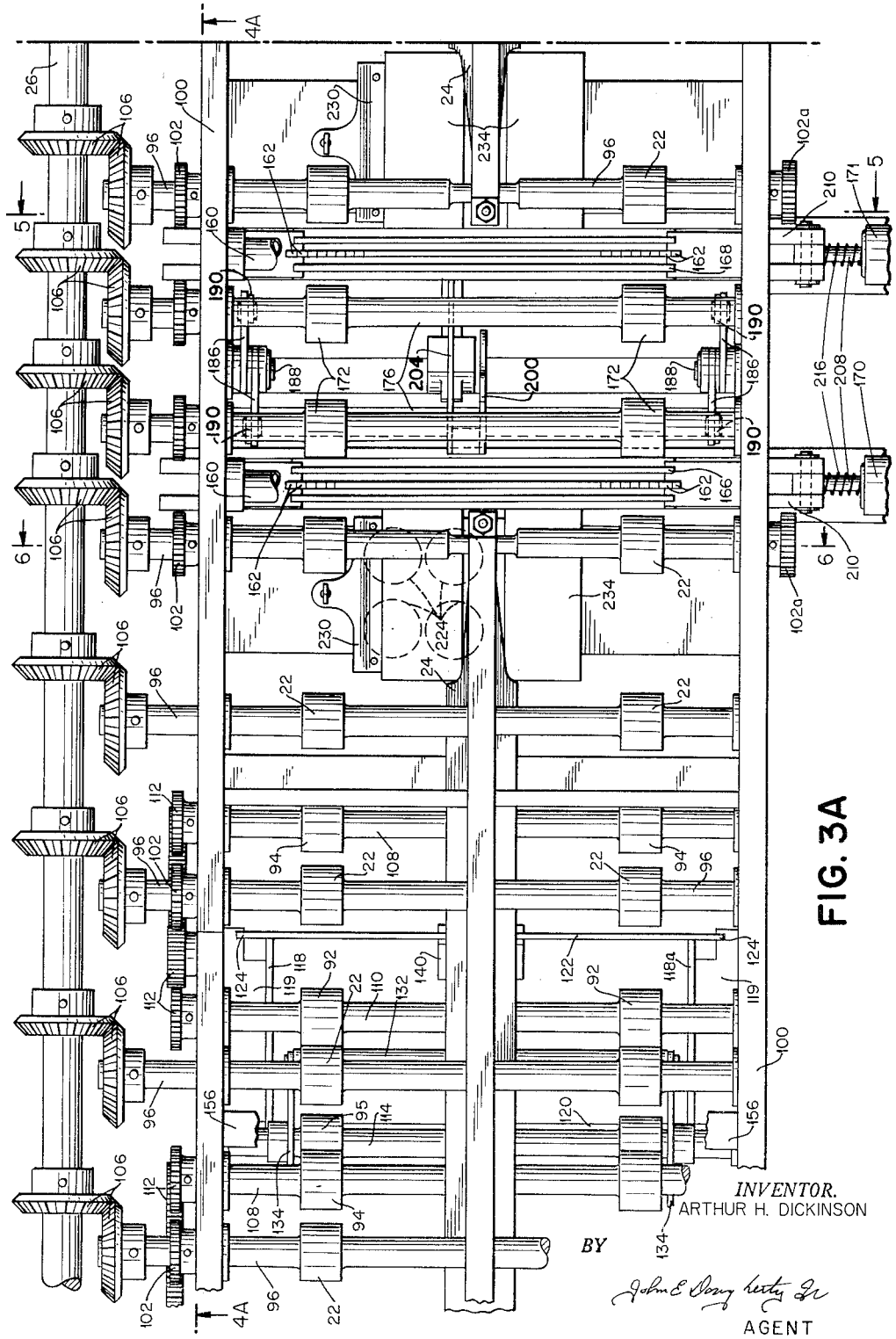

FIGS. 3A and 3B take together constitute a plan view of the parts shown in FIGS. 2A and 2B, with some upper structure broken away to show lower details.

FIG. 4A is a sectional view taken on lines 4A—4A of FIG. 3A.

Figure 4B:
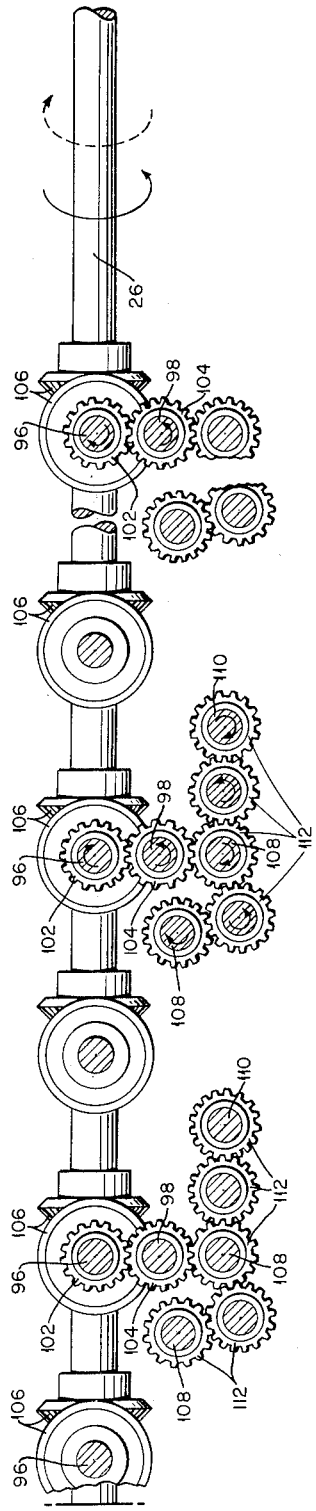

FIG. 4B is a sectional view taken on lines 4B—4B of FIG. 3B.

FIG. 5 is a sectional view taken on lines 5—5 of FIG. 3A.

Figure 6:
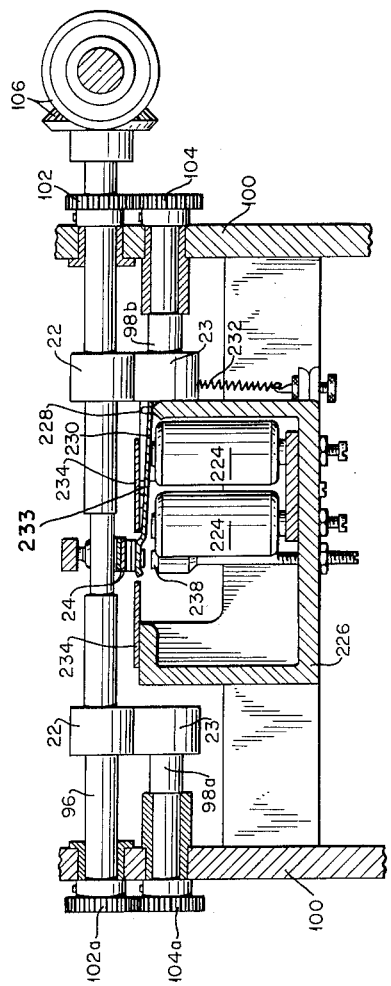

FIG. 6 is a sectional view taken on lines 6—6 of FIG. 3A.

Figure 7:
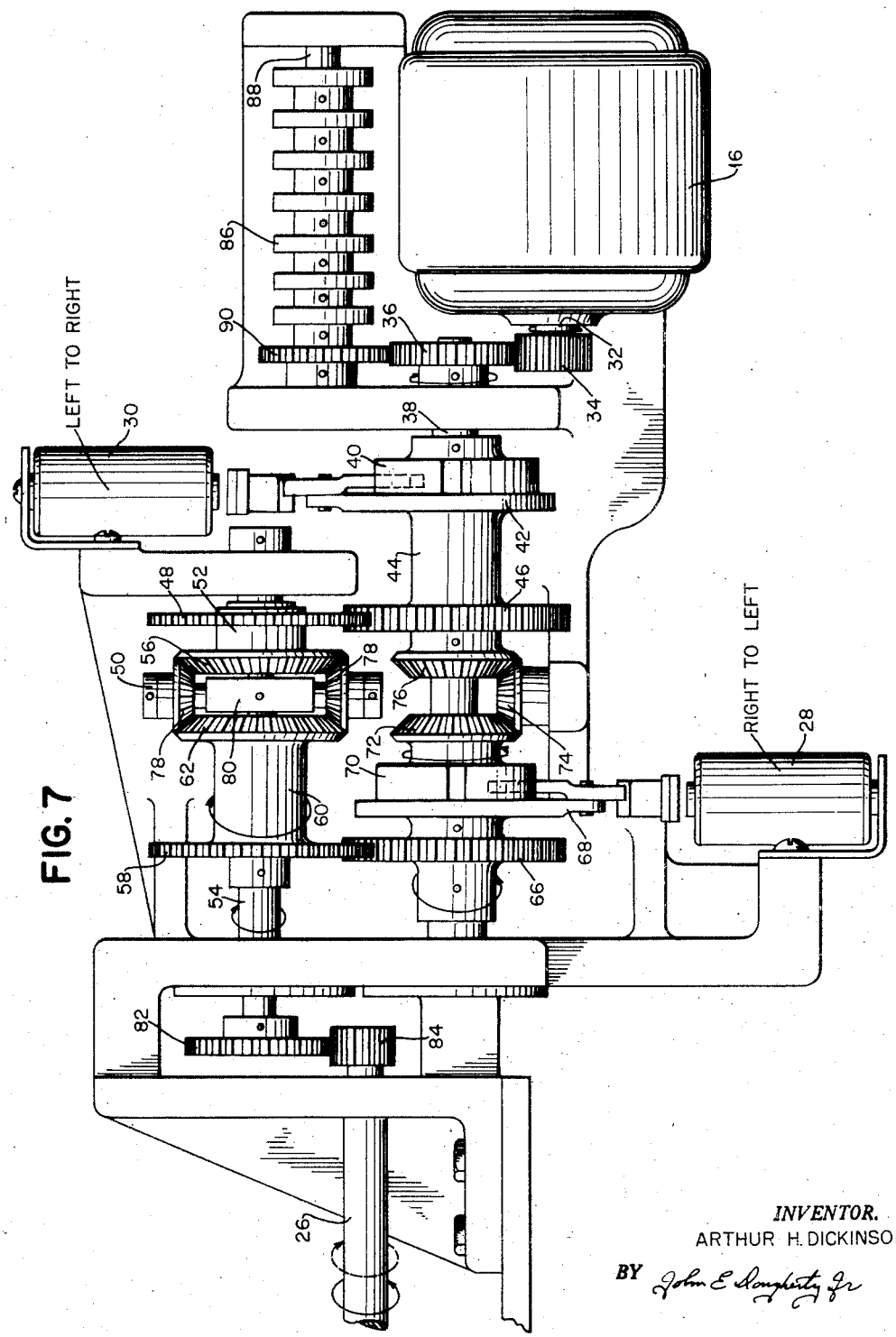

FIG. 7 is a sectional elevation of the reversible drive mechanism.

Figures 8, 9A:
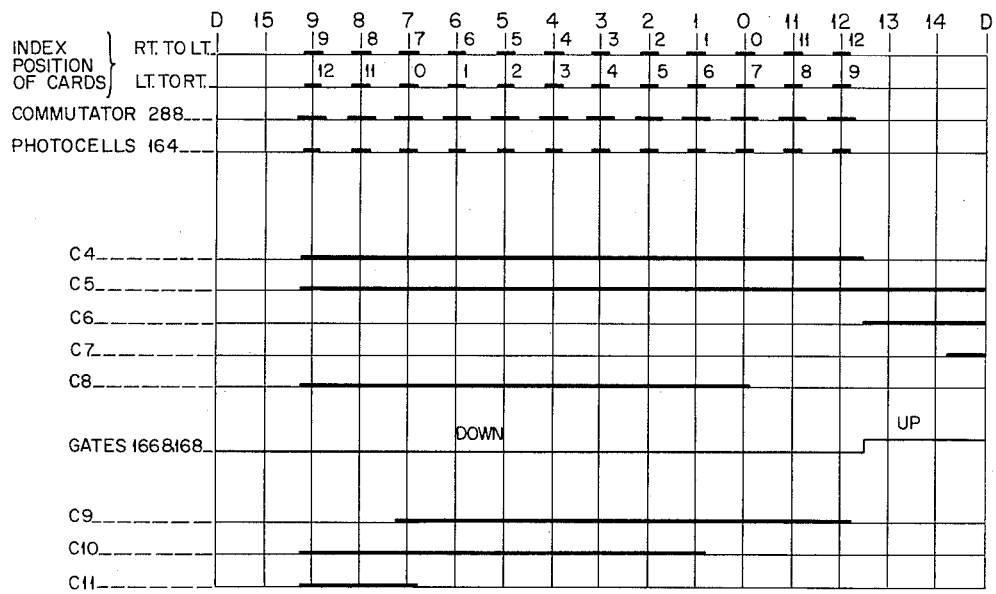

FIG. 8 shows a record card of the type utilized with the machine.

Figure 9B:
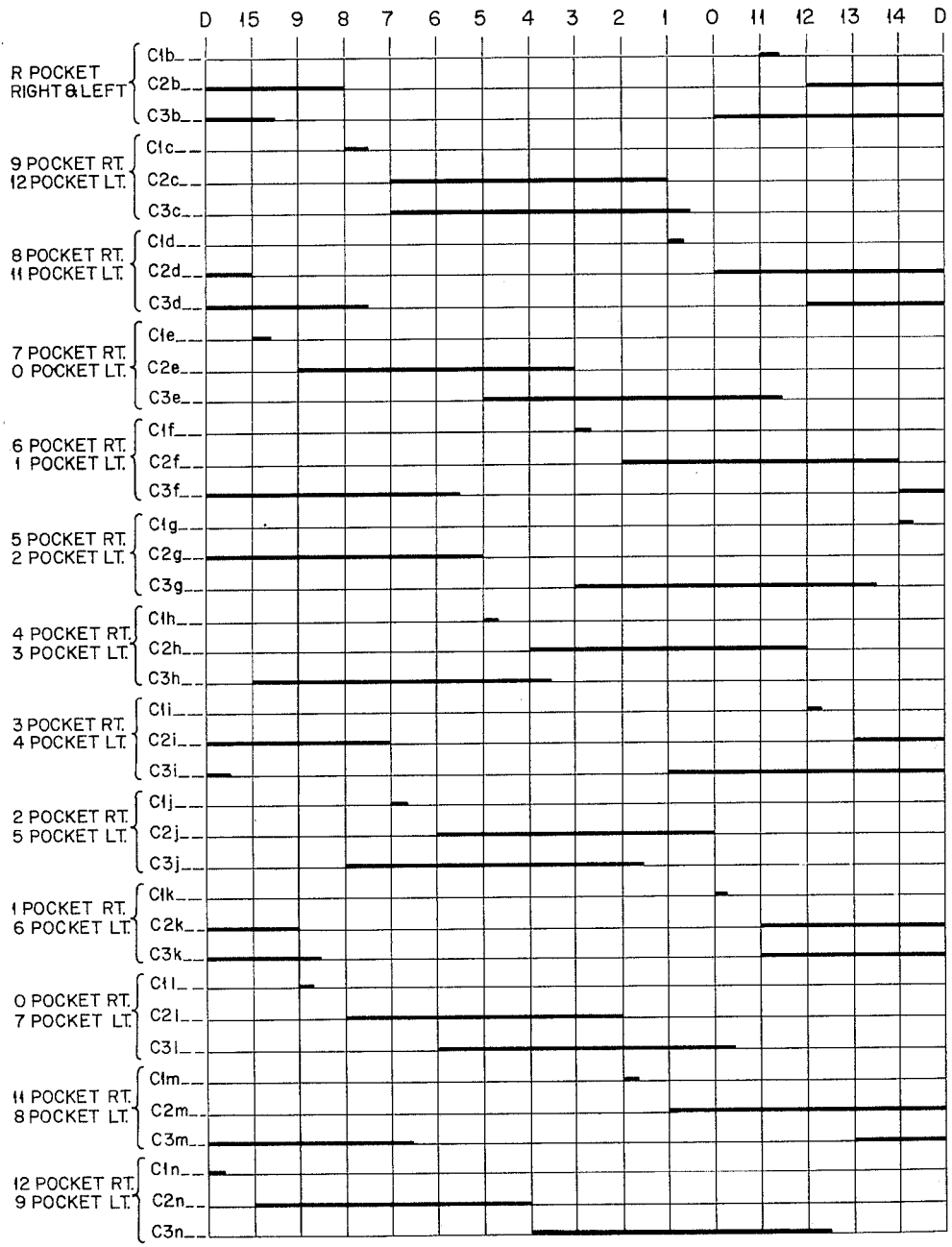

FIGS. 9A and 9B constitute a timing diagram for the machine.

FIGS. 10A, 10B, 10C, 10D, 10E and 10F constitute a wiring diagram for the machine.

Figure 10A:
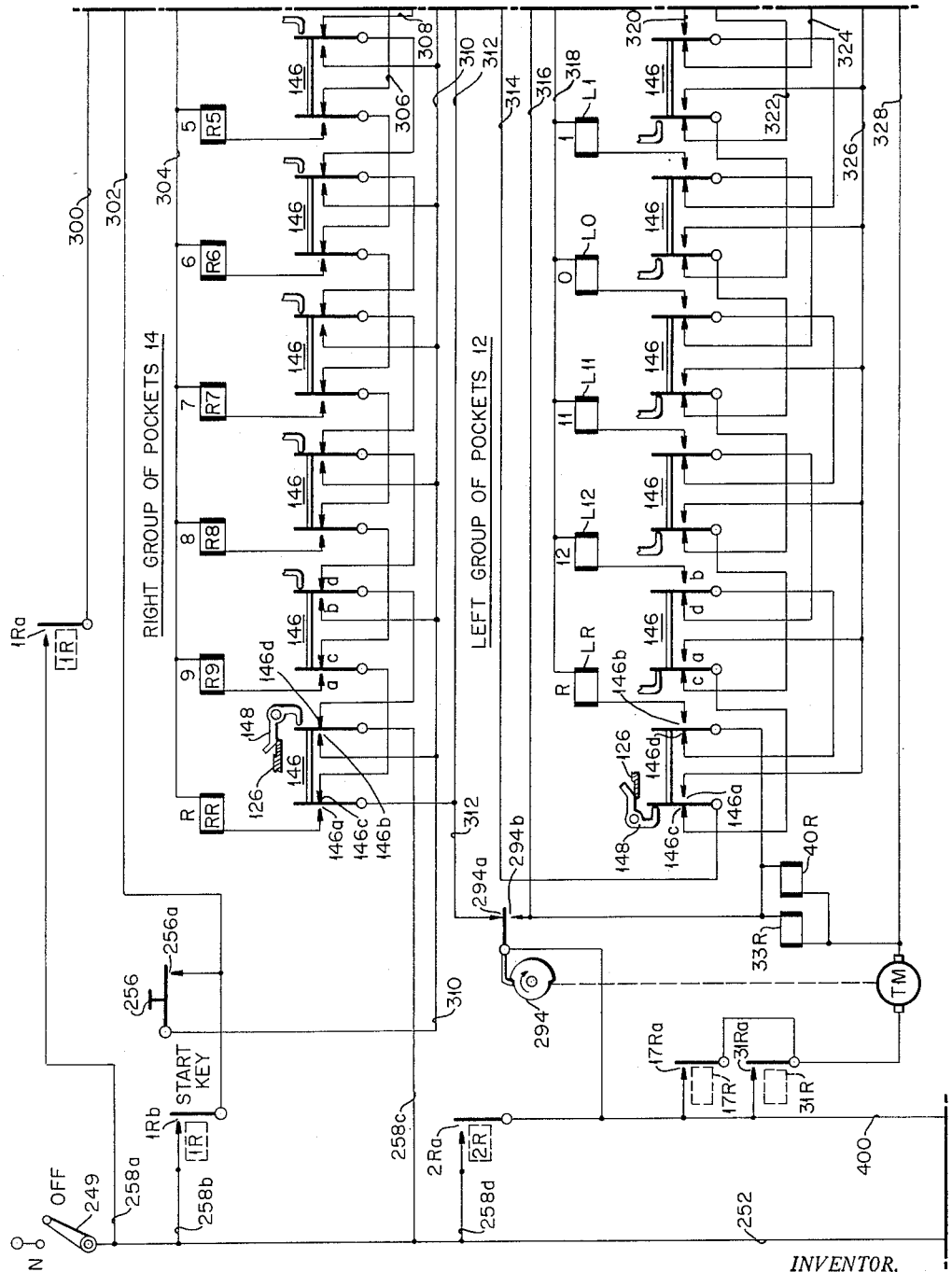
Figures 10C, 11:
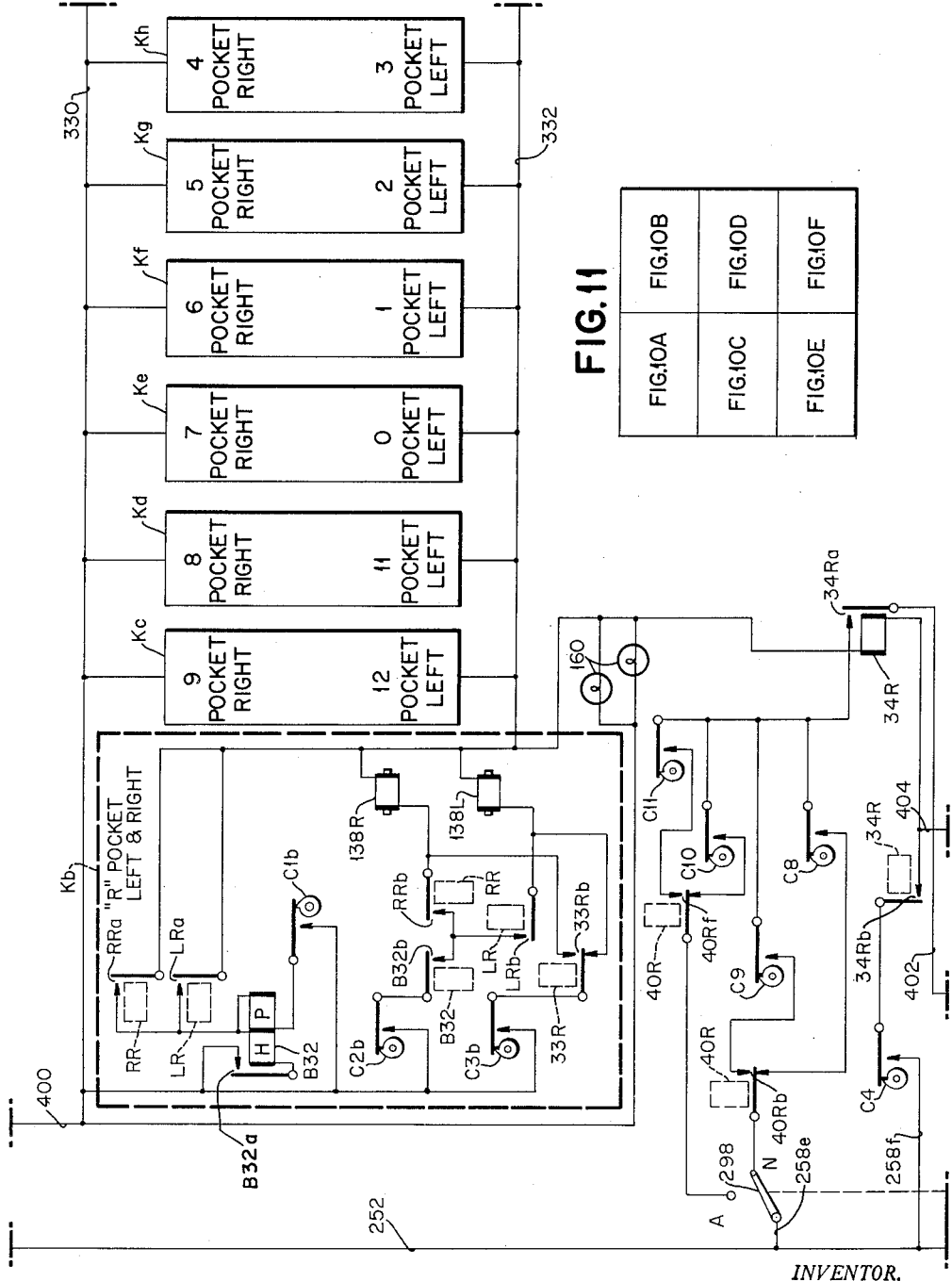

FIG. 11 indicates the manner of arranging FIGS. 10A through 10F.

The description of the invention as embodied in these figures will be in the following order. First, a general description of the over-all machine and its mode of operation will be given; then, a detailed description of the various functional units of the machine will be given; and finally there will be described the operation of the circuits controlling these units during the completion of a particular sorting problem.

GENERAL DESCRIPTION

Figure 1:
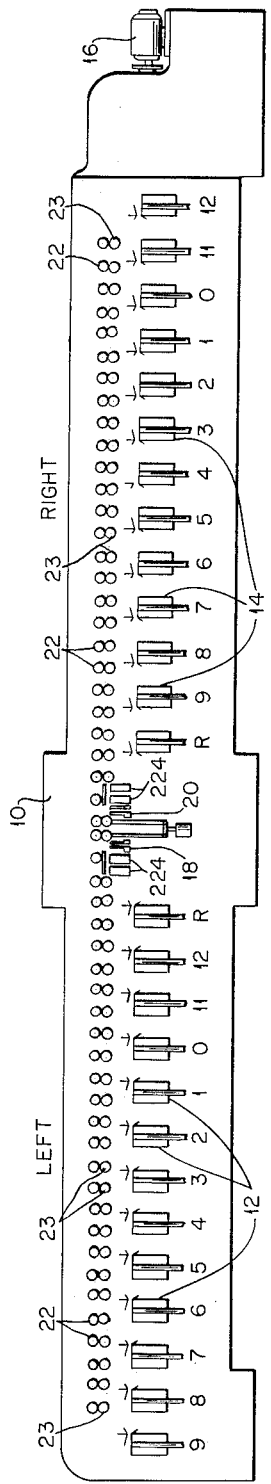
FIG. 1 is a side view, partly schematic, of a machine embodying the invention.

As shown in FIG. 1, the machine comprises a sensing station, which is generally designated 10, located between two similar groups of card pockets 14 and 12 which will be hereafter designated as Right and Left card pockets. Each of these groups comprises 13 pockets, one for each index point position of the well-known "IBM" type card, an example of which is shown in FIG. 8, and a reject pocket.

The machine is driven by a motor 16 through reversible drive mechanism, later to be described, which drives a plurality of card feed rolls 22 and 23 provided to process the cards from one group of pockets to the other. The sensing station 10 comprises two rows 18 and 20 of photoelectric sensing devices. The left row as viewed in FIG. 1 is controllable to sense cards during a Right to Left sort operation and the right row is controllable to sense cards during a Left to Right sort operation.

Groups of cards to be sorted are placed at random in the Right cards pockets 14. A pair of switches, later to be described, are set to designate the lowest order column of the field to be sorted and the number of columns in the field. A start key is then depressed and the feed mechanism including rolls 22 and 23 in FIG. 1 will be driven to feed cards from right to left. The cards placed in the Right pocket 14 nearest the sensing station 10 will then be fed individually therefrom to the sensing station where they will be sensed by the left row 18 of sensing devices. A plurality of chute blades 24, (FIG. 2A) are controllable by these sensing devices to direct the card being fed into the proper card pockets 12 of the Left group. This procedure will continue until all of the cards are fed successively from all of the Right pockets and sorted properly into the Left pockets, at which time the reversible drive mechanism will be controlled to drive the feed mechanism so as to feed cards from left to right. If the sort field contains only numeric information, then during this Left to Right operation, the right row 20 of sensing devices are controlled to be responsive to the next higher column order of the field being sorted. This back and forth operation is continued until all columns of the field have been sorted. If the field being sorted contains an even number of card columns, the last sorting operation will leave the cards in the Right group of pockets 14 from which they may be removed in the desired sequence. If the field contains an odd number of card columns and the last sorting operation directs cards to the Left group of pockets 12, it is then necessary to resort the cards on the last column so that they may be removed in the proper sequence from the Right group of pockets 14.

FUNCTIONAL UNITS

*Reversible drive mechanism.*—Referring to FIG. 7, there is shown the reversible drive mechanism which couples the drive motor 16 to a horizontal shaft 26 which in turn drives the various card feed rolls which transport cards between the card pockets. This mechanism is under the control of a pair of solenoids 28 and 30, one of which is always energized when the machine is in operation. When solenoid 28, the Right to Left solenoid, is energized, shaft 26 will be driven in the direction indicated by the full line arrow shown in FIG. 7. Rotation of the shaft 26 in this direction will cause the feed rolls 22 and 23 to be driven to feed cards from the Right to the Left group of pockets shown in FIG. 1. If solenoid 28 is deenergized and solenoid 30 is energized, then the direction of rotation of shaft 26 will be reversed and the feed rolls will be driven to feed cards from the Left group of pockets to the Right group of pockets. This reversing of the drive to horizontal shaft 26 and the feed rolls driven thereby is accomplished in the following manner.

Motor 16 drives a shaft 32 to which is attached a gear 34 which is continuously driven in the direction indicated in FIG. 7. Gear 34 in turn drives gear 36 which is secured to shaft 38 suitably mounted for rotation in the side frames. Secured to shaft 38 is the driving element 40 of a well-known type single revolution clutch which is associated with the Left to Right solenoid 30. Details of clutches of this type are shown and described in Patents No. 2,131,919 and 2,265,441, issued respectively on October 4, 1938, and December 9, 1941. The driven member 42 of this clutch is carried on a hub 44 which is freely mounted on shaft 38. With solenoid 30 in the deenergized condition shown, the driven element 42 is held out of engagement with the driving element 40 causing the hub 44 and a gear 46 secured thereto to remain stationary.

With gear 46 stationary, gear 48, which is one of the input gears to the differential drive mechanism generally designated 50, will also remain stationary. This input gear 48 is carried on a hub 52 which is freely mounted on a shaft 54, which shaft is in turn mounted for rotation in the side frames. To the other end of hub 52 is secured gear 56 which is one of the differential drive gears and which is thus held stationary when the Left to Right solenoid 30 is in the deenergized condition.

The other input to the differential drive mechanism is transmitted through input gear 58 to another differential drive gear 62 which gears are carried on a hub 60 freely mounted on shaft 54. This input gear 58 is driven through another gear 66 which is integral with the driven element 68 of a single revolution clutch associated with the Right to Left solenoid 28. The driving element 70 of this clutch is in turn integral with the bevel gear 72 which through similar gears 74 and 76 is continuously driven by motor 16. The purpose of these gears 72, 74 and 76 is to reverse the rotational movement transmitted from shaft 32 so that the input gears 48 and 58 for the differential drive mechanism 50, when driven, will be driven in opposite directions. When Right to Left solenoid 28 is energized, the driven element 68 will be coupled to its driving element 70 to thereby drive gears 66 and 58 in the direction indicated. The differential drive gear 62 will be similarly driven and the bevel gears 78 will be thereby rotated. With the other differential drive gear 56 held stationary, the rotation of the bevel gears 78 will cause an arm 80 to which they are attached to be rotated in the same direction as differential drive gear 62. This arm is secured to shaft 54 which will be rotated by arm 80 to drive through gears 82 and 84 the main horizontal drive shaft 26 in the direction indicated by full line arrow, which is the proper direction for Right to Left machine operation.

For Left to Right operation the solenoid 28 is deenergized and solenoid 30 is energized causing differential drive gear 62 to be held stationary and the other differential gear 56 to be rotated. This rotation through bevel gears 78 and arm 80 will cause the main horizontal shaft 26 to be rotated in the direction indicated by the dotted arrow in FIG. 7, which is the proper direction for Left to Right machine operation.

The design of the gearing above described is such that one revolution of either single revolution clutch element 68 or 42 will cause the various feed rolls to be moved peripherally a distance of four inches which in the present machine is equivalent to one card cycle. The cards utilized are the well-known IBM type record cards, which are three and one quarter inches wide. Cards are fed in the direction of this dimension thus allowing for a space of three quarters of an inch between successively fed cards. Since each of the cards includes 12 index point positions which are spaced one quarter inch apart, it is convenient to refer to such a card cycle as a 16 point cycle.

Reference should also be made here to a group of circuit breaker cams generally designated 86 in FIG. 7. As there shown, these cams are secured to shaft 88, which shaft is drivably connected through gears 90, 36 and 34 to motor drive shaft 32. Cams 86 are thus continuously driven in the same direction as long as motor 16 is running. The gearing is such that these cams complete one revolution for each 16 point card cycle. Circuit breaker contacts, not here shown, are associated with each of these cams and are operated to control machine operations in a manner which will be later described with reference to the circuit diagram.

*Card feed mechanism.*—The cards are fed in the machine by a plurality of feed rolls which may be generally classified in three groups. The first of these comprises the horizontal rows of the upper feed rolls 22 and lower feed rolls 23 shown in FIG. 1, which are provided to feed the cards back and forth between the pockets 12 and 14. The second group comprises those feed rolls which are associated with each card pocket and are provided to feed cards into and out of the respective pockets. Referring to FIG. 2B, this second grfoup includes the single set of feed rolls 92 located above each pocket and two pairs of associated upper and lower feed rolls 94 and 95, respectively, located between the pockets and the aforementioned horizontal rows of feed rolls 22 and 23. The third group comprises those feed rolls directly associated with the sensing stations and their operation will be discussed when that unit is described.

All of the aforementioned feed rolls are driven from horizontal shaft 26 which shaft is in turn driven by motor 16 through the reversible drive mehcanism previously described. As shown in FIGS. 2B and 3B, the upper and lower feed rolls in the horizontal rows are secured to shafts 96 and 98 which are suitably mounted for rotation in side frames 100. Alternate pairs of the shafts 96 and 98 have secured to their respective ends, gears 102 and 104 (FIG. 4B). Each gear 102 so mounted is meshed with the associated gear 104 and the upper gear of each pair, as is shown in FIG. 4B, is drivably connected through bevel gears 106 to the horizontal shaft 26. With the horizontal shaft 26 being rotated in the direction indicated by full line arrow, these gears will be rotated to drive their shafts 96 and 98 in the direction shown to feed cards from the Right group of pockets to the Left group of pockets. Both the upper and the lower feed rolls 22 and 23 connected to the shafts above described are directly driven. The other pairs of upper and lower feed rolls, alternately spaced between these, have a direct drive only to the upper feed rolls 22, the lower feed rolls 23 being driven by frictional engagement therewith.

The single set of feed rolls 92 located above each of the card pockets, as well as the upper and lower feed rolls 94 and 95 associated therewith, are similarly mounted on traverse shafts. Shafts 108 to which the upper feed rolls 94 are secured, and shaft 110 to which the feed rolls 92 above each pocket are secured are all driven by gearing which is generally designated 112 in FIG. 4B. The lower feed rolls 95 similarly mounted on shafts 114 are not directly driven, but are biased to frictionally engage the upper rolls 94 and are driven thereby.

*Card pockets.*—The card pockets 12 and 14 in the Left and Right groups, respectively, are of the same construction and operate in the same manner. Referring to FIGS. 3A and 3B, it may be seen that each of the pockets 12 and 14 is formed of a pair of guide members 118 and 118a and a pair of side plates 120 and 122. The inner guide member 118 and the outer side plate 120 of each pocket are secured on brackets 119 secured to the side frame 100. As is shown in FIGS. 2A and 2B, there is provided for each of the pockets 12 and 14 a lower support member 135, which members are secured to the opposing side frames 100. The front guide member 118a (FIG. 3B) for each pocket is hinge connected to this support member 135 and is normally locked by a suitable latch, not shown, in a vertical position. When it is desired to place cards in a pocket or remove them therefrom, the particular guide member 118a is unlatched and pivoted outward thereby providing access to the pocket. The inner side plate 122, which is the plate nearest the sensing station 10 for both groups of pockets, is slidably mounted in grooves 124 provided in brackets 119.

These guide members 118 and 118a and side plates 120 and 122 of each pocket frame form suitable means for aligning and holding aligned cards which are carried therein on a movable platform 126. This platform 126 for each pocket is, as shown in FIG. 2B, carried on a vertical tube 128 which is slidably mounted on the lower support member 135. Compression springs 130 are provided to bias the platforms 126 upwardly. The extent of the upper travel of the platforms 126 and cards 11 carried thereon is normally governed by an idler roll 132 provided above each pocket. Each idler roll 132 is carried by a pair of arms 134 freely mounted on one of the shafts 114. Shafts 114, as have been previously described, also carry lower feed rolls 95. One arm 134 of each pair is at its lower end connected to one of a plurality of transverse rods 136. There is provided for each pocket 14 a solenoid 138R and for each pocket 12 a solenoid 138L. Each of these solenoids operates a plunger 137 connected to one of the transverse rods 136. This structure is shown for the R pocket in FIG. 2B wherein a portion of the outer structure for this pocket has been broken away to reveal this mechanism. The structure for the other pockets is similar, though not shown in these structural drawings, however, the manner in which these solenoids are connected in the electrical control circuits for the machine is illustrated in FIGS. 10C and 10D which are described below in detail. The purpose of these solenoids and of the structure above described is to control feeding into and out of the pockets in the manner about to be described.

Each of the movable side plates 122 is slotted at its upper end to provide a space through which cards may be fed. Cards being fed through this slot are guided by a throat assembly comprising a knife extension 142 and a curved guide member 140 carried on each plate 122. The member 140 is adjustable vertically on the plate 122 so that the throat may be properly adjusted to allow only one card at a time to be fed into or out of the pocket. When cards are initially placed in a card pocket 14 anticipatory of a sorting operation, the cards and pocket structure are in the position shown for the 9 pocket in FIG. 2B. The spring 130 is urging platform 126 upward, but the cards are being held away from the feed roll 92 by idler roll 132. Associated with each of the pockets is a pocket contact assembly 146. Each of these contact assemblies comprises a pair of normally open contacts 146a and 146b and a pair of normally closed contacts 146c and 146d. These contacts are operated under control of levers 148 which are pivotally carried on a frame extension 150. The levers for the Right group of pockets 114 are normally biased, by springs not shown, in a counterclockwise direction while those in the Left group of pockets 12 are biased in a clockwise direction. With no cards in a pocket, as shown in FIG. 2A, the biased lever 148 enters a recess 149 provided in card platform 126. In this condition the contacts of assembly 146 will be in their normal position, i.e., with contacts 146a and 146b open and contacts 146c and 146d closed.

When cards are placed in a pocket, lever 148 is moved out of recess 149 thereby causing it to be pivoted to transfer the contacts in assembly 146. The machine is designed so that the pockets nearest the sensing station will be the first to be fed from. Thus, with cards placed in the Right group of pockets, as shown in FIG. 2B, the solenoid 138R associated with the R pocket 14 will be energized under the control of the contact assembly 146. Energization of this solenoid 138R will move its plunger 137 causing rod 136 to pivot arm 134 clockwise and thereby raise idler roll 132 to the position shown in FIG. 2B for the R pocket 14. Raising of idler roll 132 will, as shown allow the platform 126 to be raised by the compression spring 130 until the top card in the pocket contacts feed rolls 92. In Right to Left feeding, feed rolls 92 will be rotated in a clockwise direction to feed cards out of the Right group of pockets 14. The curved plate member 140 extends over platform 126 and thus this member along with the movable side plate 122 to which it is secured will also be raised to the position shown with the throat formed between extension 142 and member 140 level with the top card 11. As previously noted the throat opening is adjusted so that only one card may be fed at a time, and only the top card card of the group is now fed by rolls 92 through this opening. Solenoid 138R is held energized for a time sufficient to allow the trailing edge of this card to be advanced past idle roll 132, by which time the leading edge of the card will have reached the bite of the feed rolls 94 and 95 adjacent to the pocket. Shortly thereafter solenoid 138R is deenergized allowing the parts to return to their normal condition which is the condition shown for the 9 pocket 14, in FIG. 2B. The card 11 thus fed is advanced by the upper and lower feed rolls 94 and 95 to the adjacent rolls 22 and 23 of the horizontal rows which rolls transport the card toward the sensing station 10.

During each successive card cycle, solenoid 138R is similarly energized and deenergized so that a card will be fed from the R pocket 14 each cycle until the pocket is emptied. Feeding of the last card from R pocket will cause the contacts in the assembly 146 associated therewith to be transferred. The transfer of these contacts will, through machine circuitry later to be described, cause the solenoid 138R for the next pocket 14 in which cards have been placed to be energized during the next card cycle. Cards will be fed in a similar manner from this and from succeeding pockets 14 until all of the pockets have been emptied.

The cards thus fed are advanced to the sensing station 10 where they are successively sensed by the Left row 18 (FIG. 2A) of photoelectric sensing devices and directed by the chute blades 24 controlled thereby to the proper pockets 12 of the Left group. The stacking operation in these pockets 12 is the reverse of the feeding operation above described. The chute blades 24 direct the cards 11 to the rolls 94 and 95 associated with the proper pocket. These rolls and the guide member 156 will direct the cards to the throat assembly for the pocket. As the leading edge of the card being stacked is fed to and through the throat assembly, the solenoid 138L associated with the pocket is held deenergized so that the parts are in a position shown in FIG. 2A for the R pocket 12. After the leading edge of the card has been fed by rolls 94 and 95 into the space between feed roll 92 and platform 126, the solenoid 138L is energized allowing the platform to raise a card until it contacts feed roll 92. Feed roll 92 will then advance the card under the raised idler 132 until the card abuts the outer side plate 120 at which time solenoid 138L is then deenergized and the pocket structure returned to its normal position with the card properly stacked on platform 126. This operation is repeated until all of the cards originally placed in the Right group of pockets 14 are stacked in the Left group of pockets 12, at which time the machine drive is reversed and the cards are similarly fed out of the Left group of pockets 12 through the sensing station 10 into Right group of pockets 14. This back and forth processing of the card is continued until the sort has been completed for each column of the sort field.

*Sensing mechanism.*—Sensing of the indicia in the columns of the cards 11 being fed through the sensing station is accomplished by two rows 18 and 20 of photoelectric sensing devices. As previously noted, the left row 18 is controlled to sense cards during a Right to Left operation and the right row 20 during a Left to Right operation. As shown in Fig. 2A, there is provided for each of these rows a tubular light source 160, which sources are mounted in suitable sockets secured to side frame 100. Mounted in a transverse row beneath each light source 160 are a plurality of light conductive rods 162. These rods 162 may be made of Lucite or a similar light conducting material and there are 80 such rods provided in each row. The rods are so arranged that each will be aligned with one column of a card being fed through the sensing station 10. Mounted beneath each group of rods 162 are a plurality of photocells 164, 80 in number, arranged in three rows. The lower end of the rods 162 are staggered in the manner shown so that each is aligned with one of these photocells 164. The function of these rods and photocells is to detect, according to the amount of light transmitted thereto, the presence or absence of holes in the corresponding columns of a card being fed through the sensing station 10 and the design is such that the photocells 164 will be rendered conductive only when a hole is punched in the corresponding column of the card 11. The time during the card cycle when the photocell is rendered conductive is indicative of the particular index point position at which the hole has been punched.

In FIGS. 9A and 9B there is shown a timing diagram for the machine. The diagram is representative of a single card cycle of machine operation which, as has been previously noted, is a 16 point cycle. When cards are to be sorted they are placed in the Right group of pockets 14 with their 9 edge nearest the sensing station 10 so that during the ensuing Right to Left feeding the 9 index point positions will be first presented to the then responsive left row 18 of sensing devices. During the second sort which is a Left to Right operation the 12 edge and thus the 12 index point position will be first presented to the right row 20 of sensing devices which are responsive during this type of feeding.

In order that the cards may be fed past these sensing devices in the proper timed relationship, a pair of gates 166 and 168 are provided. Gate 166 is operated during a Right to Left operation to register the cards being fed immediately before they are advanced past the left row 18 of sensing devices. Gate 168 is similarly operated during a Left to Right operation to register the cards with respect to the right row 20 of sensing devices. The timing of the circuitry controlling the control solenoids 138R and 138L associated with the card pockets and the distance between the pockets 12 and 14 and the gates 168 and 166, respectively, is such that a card being fed in either direction will reach the register gate for that direction of feeding shortly before the beginning of a card cycle.

The gates 166 and 168 are constructed and operated in the same manner, under the control of solenoids 170 and 171, respectively. The gates are normally in the down position shown in FIG. 2A, but can be raised to register cards in a manner best explained with reference to FIG. 5 which shows the structure associated with gate 168. Gate 168, as has been mentioned, is operated during a Left to Right operation, during which the cards 11, being fed from pockets 12, will reach this gate shortly before the beginning of a card cycle. Circuitry, later to be described, is effective, shortly before the arrival of a card at this point, to energize the solenoid 171. Energization of this solenoid 171 will pull the plunger 208 associated therewith to the left, thereby causing a cross bar 210 attached to the plunger to be moved in the same direction. Pivotally attached to cross bar 210 are a pair of levers 212 which at their other ends are similarly connected to gate 168. A pair of guide posts 213 secured to side frame 100 have slots 214 which are provided to guide gate 168 for vertical movement. These slots 214 prevent any horizontal movement of the gate 168 and thus the horizontal movement of cross bar 210 pivots levers 212 to thereby raise the gate. As noted above, this operation occurs near the end of a card feed cycle and prevents any further advance of the card until the gate 168 is lowered at D time (FIG. 9A) or the beginning of the next card feed cycle when solenoid 171 is deenergized. The deenergization of solenoid 171 will allow a compression spring 216 on plunger 208 to restore the plunger and the attached bar 210 to the normal position shown, thereby lowering gate 168. In this way the passage of the cards 11 past the sensing devices is accurately timed so that the chute blades 24, which are controlled thereby, may be actuated to direct the cards, in a manner later to be described, into the proper pockets.

Feeding of the cards through the sensing stations is accomplished by two pairs of upper feed rolls 172 operating in conjunction with two pairs of lower feed rolls 174. These upper and lower feed rolls are mounted on shafts 176 and 178, respectively, which shafts are, as shown in FIG. 4A, drivably connected through gears 180, 182 and bevel gears 106 to the main drive shaft 26. The transverse shafts 176 for the upper feed rolls are mounted for rotation in side frames 100, but the lower shafts 178 are mounted for rotation on pairs of opposed levers 186 which, as is shown in FIG. 3A, are pivotally mounted on studs 188 secured to side frame 100. Also connected to either end of each of the shafts 178 are pairs of vertical arms 190 which arms are pivotally connected at their lower ends to parallel cross bars 192 (FIG. 2A). Cross bars 192 are each connected to a transverse rod 195 which is in turn connected to a plunger 194 of a control solenoid 196. Solenoid 196 is normally deenergized allowing a spring 197 on plunger 194 to bias the structure to the condition shown with rolls 174 operatively engaged with upper rolls 172.

Cards fed from the pockets 12 or 14 during a sorting operation are advanced to the sensing station by feed rolls 22 and 23. Feed rolls 172 and 174 then advance the cards toward the rows 18 or 20 of sensing devices according to the direction of feeding. As the card is fed against the proper timing gate 166 or 168 which is raised to register the card with respect to the sensing devices, the solenoid 196 is energized, thereby lowering plunger 194 and thus, through rod 195, the cross bars 192 against stop studs 198. Since these arms are connected to shafts 178 which shafts are in turn carried on the pivotal arms 186, this lowering action will pivot the arms around studs 188. The shafts 178 and feed rolls 174, carried thereby, will be pivoted with the arms 186. This pivoting shifts feed rolls 174 with respect to upper feed rolls 172, thereby allowing the rolls to slip freely on the card now abutting the proper timing gate 166 or 168. This slipping of the feed rolls on the card prevents the edge of the card now abutting the gate 166 or 168 from being unduly damaged. The circuitry controlling solenoid 196 is designed so that the solenoid will be deenergized to allow the feed rolls 174 again to operatively engage the card at the sensing station when the register gate 166 or 168 is lowered at the beginning of the next card cycle of machine operation. The card is then advanced by rolls 172 and 174 in the proper timed relationship past the proper row of sensing devices to the adjacent feed rolls 22 and 23 which transport the card to the selected pocket on the other side of the machine.

*Pocket selection mechanism.*—Cards being fed through the machine are directed to the proper pockets by a pair of pocket selection units 220 and 222 associated respectively with the rows 18 and 20 sensing devices. The operation and structure of each of these units is the same. The units being similar it is deemed sufficient to describe in detail the unit 220 which is controllable by the sensing devices in row 18 to direct cards into pockets 12 according to the indicia sensed during a Right to Left machine operation. As shown in FIGS. 2A and 6, unit 220 includes a bank of four magnets 224 secured to a frame assembly 226 mounted between side frames 100. It should be here noted that the lower feed rolls 23 at the card selection unit are carried on studs 98a and 98b mounted in the opposing side frames 100. An extra pair of gears 102a and 104a are provided in order that the lower roll 23 mounted on stud 98a might be directly driven. This construction is necessary to allow space for the mounting of frame assembly 226.

Associated with the magnets 224 is an armature 230 which is mounted on a knife edge 228 provided on frame assembly 226. Armature 230 is normally biased away from the magnets 224 to the position shown, by a tension spring 232. The extent of the clockwise pivoting of armature 230 under influence of spring 232 is limited by a pair of backstops 233 mounted on one of a pair of plates 234 carried on frame assembly 226. These plates are level with the bite of the feed rolls 22 and 23 and form a platform to guide the cards being fed through the pocket selection unit 220. Located above the armature 230 is a plurality of chute blades 24, twelve in number, which blades are biased to rest on the armature in the manner shown in FIG. 2A. The arrangement is of the type shown and described in the above mentioned Patent No. 1,741,985 to which reference may be made for a detailed explanation. The blades are of varying length and each extends to the guide plates 156 associated with one of the pockets 12. The arrangement is such that the top blade of the group extends to the guide plates 156 associated with the 9 pocket which is the last pocket in the Right group. The next lower blade extends similarly to the guide plates associated with the 8 pocket, the third lower blade to those associated with the 7 pocket, etc. Each of the blades 24 has formed on its under side a lip extension 24a which is located above the end of the blade immediately below it. There being no blade above the 9 pockets a similar lip is mounted to the frame above the end of that blade.

The tips of the blades 24 resting on armature 230 are bent upwards so that a card being fed through the unit in the condition shown, would pass under all of the blades. A card thus fed would be advanced to the second set of feed rolls 22 and 23 at which time the lip extension 24a on the lowermost chute blade 24 would direct it between the guide plates 156 to the feed rolls 94 and 95 associated with the R pocket 12. These rolls would advance the card to the R pocket for stacking in a manner previously described.

When the magnets 224 are energized under control of the photoelectric sensing devices sensing a hole in a card being fed, the armature 230 will be attracted and the biased blades 24 will tend to follow the armature as it is pulled downward against an armature stop 238. The distance between the tips of adjacent chute blades is equal to the distance between index point positions on the card. The distance between the row 18 of sensing devices and the top or 9 blade, which is the nearest blade thereto, is such that when the 9 index point position of a card is coincident with the row of sensing devices the leading edge of the card will have been advanced to a point in FIG. 2A just to the right of the 9 blade 24. Similarly when the 8 index point positions are presented to the row of sensing devices the leading edge of the card will have been advanced under the 9 blade and will be at a point just to the right of the next blade which is the 8 blade. Thus, it becomes obvious that as each index point position of the card is presented to the row of sensing devices the leading edge of the card will be at a point just to the right of the tip of the blade associated with the pocket 12 corresponding to that index position. When the index point, at which a hole has been punched in the column being sorted, is presented to the sensing station, the photoelectric cell for that column will be rendered conductive to complete a circuit to energize magnets 224. If we consider, for example, that a hole is sensed at the 7 index point position, the card will at that time have been fed under the 9 and 8 blades 24 and will prevent these blades from following the armature 230 as it is pulled downward by the then energized magnets 224. The third blade from the top, which is the 7 blade, and all the rest of the blades will follow armature 224 and the card will be fed over the 7 blade until it reaches the end of this blade. The lip extension 24a provided on the underside of the 8 blade at this point will guide the card between the guide plates 156 associated with the 7 pocket into which the card will then be stacked.

As previously mentioned the operation of the Left unit 222 is similar. However, since the 12 edge of the card is the leading edge during Left to Right operation, the pockets, with the exception of the R pocket 14, are in the reverse order with respect to the sensing station 10. Thus, the top blade for this unit 222 is associated with the last pocket 12 of the group and is termed the 12 blade, the next lower blade, the 11 blade, etc. reject or R pocket of each group is nearest the sensing station and is provided to receive cards having no hole punched in the column being sorted.

It should also be noted that, when cards are fed out of any pocket to the sensing station, they are also fed over the chute blade 24 associated with the particular pocket. The extension 24a on the next higher blade will, as before, guide the cards into the passage formed by the two blades. The blades 24 are so formed at their ends nearest the sensing station that they will not interfere with feeding of cards in this direction.

CIRCUIT DESCRIPTION

Figure 1A:
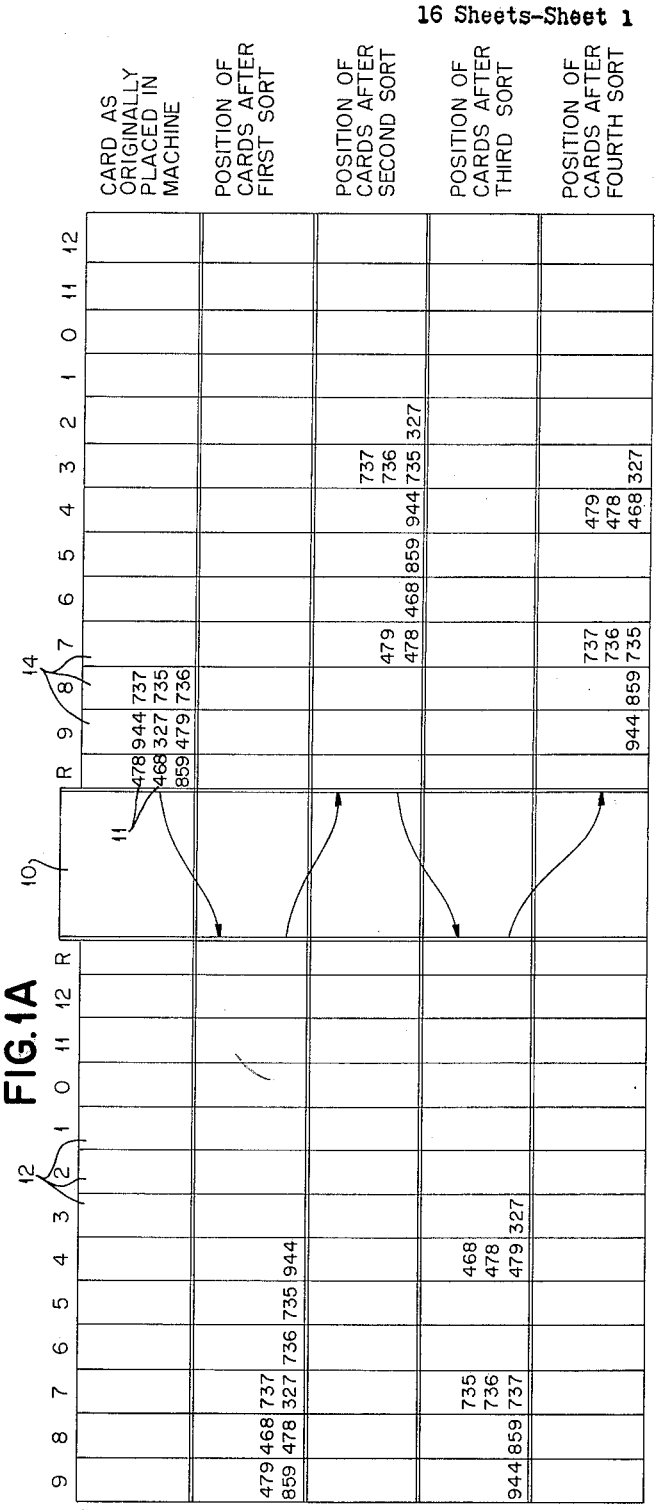
FIG. 1A is a schematic diagram illustrating the operation of the machine during a particular sorting procedure.

The electric circuitry which controls the above described mechanism will now be described with reference to an illustrative sorting problem. The cards 11 to be sorted are of the well-known IBM type, an example of which is shown in FIG. 8. In the problem to be described, a group of cards are to be arranged in sequential order according to the numeric information contained in a field comprising columns 3, 4 and 5 of each card. The card shown in FIG. 8 has the number 478 punched in this field. This card and the other cards of the group to be sorted are placed face down in the Right group of pockets 14. The machine operation will be described with reference to FIG. 1A which schematically shows the position of the cards in the pockets initially, and after each machine operation until the sorting is completed. In the preferred embodiment of the machine herein disclosed, the card carrying capacity of each of the individual pockets is approximately 500 cards, it being understood that this capacity might be increased or decreased by varying the depth of the pockets. In the illustrative example being described, the cards are initially placed three in a pocket in order to more simply explain the operation of the machine. Since the cards are to be fed successively from the pocket 14 nearest the sensing station, they are advantageously placed in the R, 9 and 8 pockets 14, as shown in FIG. 1A. In that figure each card is shown schematically with the information punched in the sort field, columns 3, 4 and 5, identifying the card; i.e., the card shown in detail in FIG. 8 is as shown in FIG. 1A, initially placed in the machine as top card in the R pocket 14 of the Right group and is identified by number 478 which is representative of the punching in columns 3, 4 and 5 of that card.

Figure 10F:
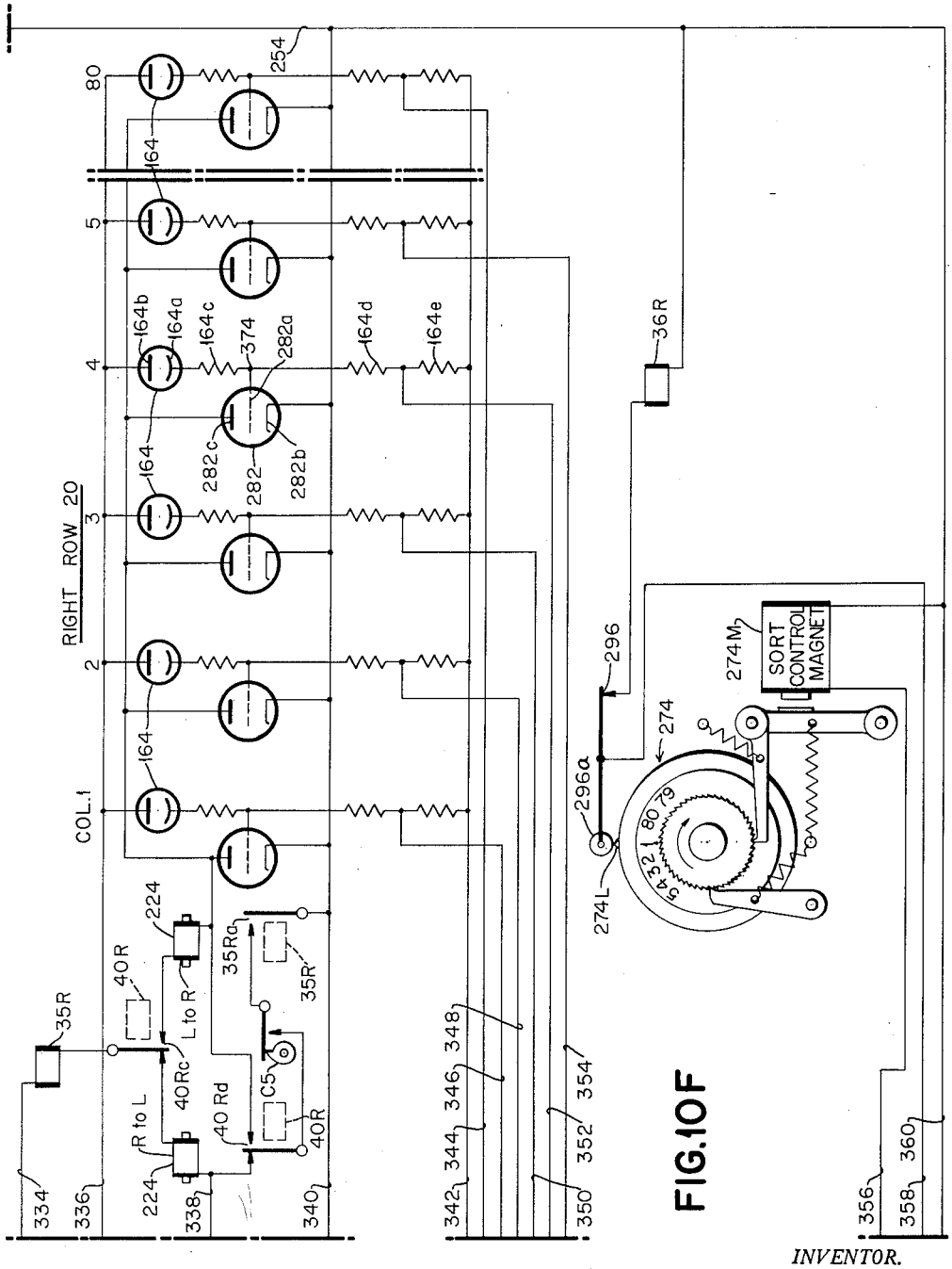

With the cards thus placed in the machine, it is first necessary to set a number of switches and thereby render them effective to control the machine to properly sort the cards on the desired field. Since the field is numeric, a switch 298, the terminals of which are shown in FIGS. 10C and 10E, is thrown to the N position. A column select switch 272, shown in FIG. 10E is set according to the column representing the lowest order of the field being sorted which, in the present case, is column 5. A sort control switch 274, shown in FIG. 10F, is set according to the number of columns contained in the field being sorted, which in the present case is three. With these switches set, a main line switch 249 is thrown to the ON position. One terminal of this switch completes a circuit to supply power to positive potential line 252 (FIG. 10A). Another terminal of this switch completes a circuit to supply power to negative potential line 254 (FIG. 10B).

The placing of the cards in the R, 9 and 8 pockets cause the contacts in the assembly 146 (FIG. 10A) for each of these pockets to be transferred so that their a and b contacts are now closed and their c and d contacts open. Thus, when the start key 256 is depressed to initiate machine operation, there is a circuit available to energize relay 1R, which circuit extends from line 252 through conductor 258c, the contacts 146b associated with R pocket 12, conductor 310, start key contacts 256a, conductor 302, relay magnet 1R, the normally closed stop key contacts 260a, and relay contacts 3Ra to negative potential line 254. Relay 1R will be held energized by a circuit extending from the relay through conductor 302, the now closed 1Rb contacts, and conductor 258b to line 252. Energization of relay 1R will also close the 1Ra contacts to complete a circuit from line 252 through conductor 258a, the contacts 1Ra, conductor 300, and motor 16 to negative potential line 254. A parallel circuit also energizes relay 2R at this time. With drive motor 16 thus started, its shaft 32 (FIG. 7) is rotated. With relay 2R energized, a circuit is available to energize the Right to Left solenoid 28 to thereby cause the main drive shaft 26 to be driven in the proper direction for Right to Left feeding. This circuit extends in FIG. 10A from line 252 through conductor 258d, contacts 2Ra now closed, contacts 294a, and conductor 312 to and through the solenoid 28 to line 254. A parallel circuit extends from the contacts 294a through the now closed pocket contacts 146a associated with the R pocket 14, to and through the coil of relay RR, and thence through conductor 304 to line 254. The energization of relay RR conditions the machine to initiate the feeding of cards from R pocket 14.

As previously described in connection with FIGS. 2A and 2B feeding from the pockets 12 and 14 is accomplished under the control of the solenoids 138L and 138R, respectively, associated therewith. Since it is necessary that the cards reach the proper register gate 166 or 168 shortly before the end of a card cycle, the feeding from the various card pockets and thus, the energization and deenergization of the solenoids 138R and 138L must be accurately timed. This is accomplished by a plurality of the circuit breaker cams 86 (FIG. 7) which operate two groups of cam contacts C1b through C1n, and C2b through C2n to control the energization and deenergization of the solenoids 138L and 138R during feeding from the various pockets. A third group of contacts, C3b through C3n control the operation of these solenoids when cards are being stacked in the pockets. The timing of these cam contacts is shown in FIG. 9B and their connection in the electrical circuitry in FIGS. 10C and 10D. The timing of each of the contacts is such that the particular solenoid controlled thereby will be energized so that cards being fed from the associated pocket will reach the proper register gate at 14 time which is one cycle point before the end of a card cycle. Referring to FIG. 10C, the circuitry which controls the feeding from the R pockets 12 and 14 of the Left and Right groups, respectively, is shown within the box therein designated Kb. There are 13 such boxes in FIGS. 10C and 10D and in each the particular pocket 12 and the particular pocket 14, for which the included circuitry controls feeding, is designated. It should be noted that each box includes circuitry for one pocket of the Left group and one pocket of the Right group and that the pockets thus associated are equally distant from the sensing station 10 (FIG. 1). The reason for such an arrangement lies in the fact that the timing control for the solenoids 138R and 138L of the associated pockets may be the same since the pockets are equidistant from their respective register gates 166 and 168. There is shown in detail only the circuitry for the R pockets of both groups, for the 11 pocket of the Right group and the 8 pocket of the Left group, and for the 12 pocket of the Right group and 9 pocket of the Left group. The circuitry for controlling feeding and stacking in the other pockets is similar and may be readily understood by referring to circuitry shown for these pockets.

With relay RR energized a circuit will be available at 11 time of the next card cycle to energize the relay B32.

Relay B32 is associated with the circuitry for controlling feeding in the R pockets, Left and Right. This circuitry extends in FIG. 10A from line 252 through conductor 258d, contacts 2Ra now closed, conductor 400, cam contacts C1b (FIG. 10C), the pick coil of relay B32, contacts RRa now closed, and conductor 332 to negative potential line 254. Relay B32 will be held energized by a parallel circuit extending from its hold coil through the now closed B32a contacts, conductor 400, and contacts 2Ra to line 252.

With relay B32 energized and its b contacts thus closed, it is now possible at 12 time of this card cycle, when cam contacts C2b are closed, to complete a circuit to energize the solenoid 138R for the R pocket 14 of the Right group. This circuit extends from line 252 to conductor 400, as above described, and thence through cam contacts C2b, the now closed relay contacts B32b and RRb, solenoid 138R, and conductor 332 to negative potential line 254.

Energization of solenoid 138R will, in the manner above described with reference to FIG. 2B, cause the idler roll 132 associated with the R pocket 14 to be raised thereby allowing the top card to be fed out of the pocket by feed roll 92. Solenoid 138R is deenergized at 8 time of the next following card cycle thereby lowering idler roll 132 and the remaining cards in the pocket. This operation will be repeated during each succeeding cycle until the three cards originally placed in the R pocket 14 have been fed therefrom. Each of these cards will begin to be moved from the pocket at 12 time of a card cycle and the distance from the pocket to the register gate 166 is such that at 14 time of the fourth card cycle thereafter the leading edge of the card fed will reach register gate 166.

The feeding of the last card out of the Right pocket 14 will cause the contacts in the assembly 146 associated therewith to be restored to their original position. Restoration of these contacts will deenergize the relay RR thereby restoring contacts RRa to their normal open condition. The opening of contacts RRa will deenergize relay B32 thereby opening the solenoid 138R associated with the R pocket 14. With the contacts of the assembly 146 restored to their original position, a circuit is now available to energize relay R9 (FIG. 10A) and thereby condition the machine to feed cards out of the 9 pocket 14 of the Right group. This circuit extends from line 252 through conductor 258d, relay contacts 2Ra now closed, contacts 294a, the c contacts of the assembly 146 associated with the R pocket, the now closed a contacts of the assembly 146 associated with the 9 pocket, to and through relay R9 and thence by conductor 304 to line 254. Energization of relay R9 will close its contacts (not shown), which contacts are connected in the circuitry provided to control feeding in the 9 pocket of the Right group and 12 pocket of the Left group. This circuitry is in FIG. 10C represented by the box Kc and the closing of these contacts will, in a manner similar to that above described in connection with feeding from the R pocket 14, cause the solenoid 138R associated with the 9 pocket 14 of the Right group to be energized and deenergized each card cycle. The energization of this solenoid is under the control of the cam contacts C1c and C2c, the timing of which is shown in FIG. 9B. The timing is such that at 7 time of the card cycle following that during which feeding of the last card out of the R pocket was initiated, the solenoid 138R for the 9 pocket will be energized to initiate feeding from this pocket. Initiating feeding of a card from the 9 pocket at 7 time will cause the card thus fed to reach the gate 166 at 14 time of the fifth card cycle following thereafter. As has been noted, the usual space between successively fed cards is three-quarters of an inch and the cards are advanced a distance of four inches each card cycle. Due to the distance between the pockets the spacing between the last card fed from the R pocket and the first card fed from the 9 pocket will be four and three-quarter inches. This spacing will not interrupt the machine operation, since, as will be later explained, motor 16 will continue to run until a relay 3R is energized at the completion of the sorting operation.

Once initiated, the feeding from the 9 pocket will continue until all of the cards have been fed therefrom, at which time the contacts of the associated assembly 146 will be restored to their original condition to thereby deenergize relay R9. Restoration of these contacts will allow the relay R8 to be energized by a circuit extending through the now closed a contacts of the assembly 146 associated with the 8 pocket. Energization of the relay R8 will condition the machine to feed cards out of the 8 pocket which feeding will continue until that pocket is also empty.

As this feeding of the cards from the succeeding pockets is taking place the leading edge of the first card fed from the R pocket 14 will have reached gate 166. A circuit is available shortly before 13 time of each card cycle to energize solenoid 170 and thereby cause gate 166 to be raised by 14 time, at which time the leading edge of the card being fed will reach the gate. This circuit extends in FIG. 10E from line 252 through conductor 258k, relay contacts 2Rb now closed, cam contacts C6 which as shown in FIG. 9A are closed shortly before 13 time, relay contacts 40Re, to and through solenoid 170, and thence through conductor 360 to negative potential line 254. Shortly after 14 time, when the card has contacted gate 166, cam contacts C7 will be closed and a parallel circuit is available to energize solenoid 196. The energization of this solenoid will, in a manner previously described, cause the lower feed rolls 174 at the sensing station to be pivoted, which pivoting allows these rolls and the associated rolls 172 to slip on the card. At D time cam contacts C6 and C7 are opened and solenoids 170 and 196 deenergized to allow gate 166 to be lowered and feed rolls 172 and 174 to again operatively engage the card. The card is then fed by these feed rolls past the row 18 of the sensing devices in the proper timed sequence, the 9 index point position being coincident with the sensing devices at 9 time (FIG. 9A), the 8 index point position at 8 time, etc. The actual sensing of the indicia in the column being sensed is under the control of a commutator cam 288, the contacts 288a of which are operated at the times shown in FIG. 9A. The particular photocell in row 18, which will be now responsive to actuate the chute blades 24, is determined by the setting of switch 272, which switch for the operation under consideration was originally set for the column 5.

In order to eliminate undesired operation of the photocells 164, the card lever contacts 206 (FIG. 2A), which are operated by a card lever 200 and contact operating arm 204 mounted on a stud 202, are connected in the circuit to condition the machine for the sensing operation. This circuit extends in FIG. 10E from line 252 through conductor 258h, card lever contacts 206, conductor 404 to and through relay 34R (FIG. 10C), and then by conductor 332 to line 254. Unless relay 34R is energized and its contacts 34Ra are closed, no sensing will be accomplished. To ensure that relay 34R will remain energized until a card has been advanced completely past the row of sensing devices, a hold circuit is provided which circuit extends in FIG. 10C from line 252 through conductor 258f, cam contacts C4, relay contacts 34Rb, to and through relay 34R, and thence, as before, to line 254. The trailing edge of each card fed will not allow the card lever contacts to open until after 9 time in card cycle during which the card is to be sensed. At this time cam contacts C4 have been closed and will remain closed to hold relay 34R energized during the entire sensing portion of that cycle.

When the first card of the group fed from the R pocket 14 is being fed past row 18 of sensing devices, relay 34R will be energized in the manner above described thereby conditioning the circuitry for sensing the 8 which is punched in column 5 of that card. The light sources 160 receive their power from a circuit which extends in FIG. 10A from line 252 through the contacts 2Ra, conductor 400, the light sources 160 in parallel (FIG. 10C), and conductor 332 to negative potential line 254. The photocells 164 in both rows 18 and 20 of sensing devices, as is shown in FIGS. 10E and 10F, have their cathodes 164a each connected through series connected resistors 164c, 164d and 164e to a negative source of potential 370. A further connection from this negative potential terminal 370 is shown in FIG. 10E to extend through a spring contact finger 272f to a common ring 272a on switch 272. This switch has 80 terminals, one corresponding to each column of a card and each terminal is provided with a spring contact finger 272e which rests on ring 272a. The construction is such that each terminal except the one representing the column for which the switch is set is electrically connected to ring 272a. The terminal corresponding to the column for which the switch is set, which for the present problem is column 5, is insulated from ring 272a by an insulating segment 272s on this ring. Thus, all the terminals on the switch, except the terminal corresponding to column 5 is held at the negative potential of terminal 370.

At 8 time of the card cycle under consideration, light from light source 160 is allowed by the hole punched in column 5 of the card to be transmitted by the associated rod 162 to the cathode 164a of the photocell 164 associated with column 5. This photocell 164 will thus be made more conductive and an increased current will now flow through a circuit which extends from line 252 through conductor 258e, switch 298 in the N position, contacts 40Rb in the condition shown, cam contacts C8, the now closed contacts 34Ra, conductor 402, cam contacts 288a, conductor 336, the anode 164b and cathode 164a of photocell 164 for column 5 of the left row 18 of sensing devices and resistors 164c, 164d and 164e to the negative potential terminal 370. A parallel circuit which extends from a junction 372 between resistors 164d and 164e to the 5 terminal of switch 272 is not now available since this terminal of the switch is insulated from ring 272a. The increased current flow in the above described circuit will raise the potential at a junction 374, which junction is located between resistors 164c and 164d and is connected to the grid 282a of a triode 282. This triode will now be rendered conductive to complete a circuit from a ground potential terminal 376 through the cathode 282b and anode 282c of the triode, and thence through conductor 338, the Right to Left sort magnets 224, relay contacts 40Rc, relay 35R and conductor 334 to the positive potential line 252. Energization of relay 35R closes contacts 35Ra thereby providing a hold circuit for this relay and for the sort magnets 224. This circuit extends from terminal 376 through conductor 340, contacts 35Ra, cam contacts C5, relay contacts 40Rd, magnets 224, contacts 40Rc, coil 35R and conductor 334 to line 252. As shown in FIG. 9A, cam contacts C5 will be closed for the remainder of the card cycle thereby holding the magnets 224 energized until the beginning of the next card cycle.

It should be noted that cam contacts C8, which control the duration of the positive pulse transmitted to the conductor 336 connected to the plates of the photocells 164, are closed each cycle from shortly before 9 time to shortly after 0 time. Thus, the above described circuitry will be available to effect energization of the Right to Left sort magnets 224 only in response to perforations sensed in the index point positions 9 through 0 of cards being fed during a Right to Left numeric sort operation.

The initial energization of sort magnets 224 occurs shortly before 8 time when the commutator contacts 22a are closed. At this time the leading edge of the card will have been fed under the first or 9 chute blade 24 and will be at a point just to the right of the 8 blade (FIG. 2A).

Thus, all the blades except the 9 blade will follow the armature 230 when it is attracted and the card will now be fed over the 8 blade and stacked in the 8 pocket 12 of the Left group.

As other index point positions of the card being fed are presented to the row 18 of sensing devices, the photocells 164 corresponding to columns in which holes have been punched, receive light from the light source 160. However, since the terminals 372 of all of the photocells 164, except the one corresponding to column 5, are connected by common ring 272a to the negative potential terminal 370, the junctions 372 between the resistors 164d and 164c in the cathode circuits of these photocells are held at the potential of terminal 370 thereby preventing the associated junctions 374 from being raised to a potential sufficient to render conductive the corresponding triodes 282. This circuit arrangement allows sort magnets 224 to be energized under the control of the photocell 164 associated with the column for which switch 272 is set and thus ensures that sorting will be accomplished on the proper column of the cards.

During succeeding card cycles the other cards placed in the Right group of the pockets will be presented to the sensing devices, and the sort magnets 224 will be energized and chute blades 24 actuated to direct the cards to the pockets 12 in accordance with the information punched in column 5 of each card.

In order that the cards might be properly stacked in the pockets 12 of the Left group, the solenoids 138L associated therewith must be energized and deenergized each card cycle. The energization and deenergization of solenoids 138L is accomplished under the control of a plurality of cam contacts C3b through C3n. For example, the first card of the group fed from the Right group of pockets 14 is stacked in the 8 pocket 12 of the Left group under the control of cam contacts C3m. These contacts, as is shown in FIG. 9B, are closed at 13 time each card cycle at which time a card being fed into the 8 pocket 12 will have been advanced to a point where its leading edge is beneath feed rolls 92. At this time a circuit is available extending as before to conductor 400 in FIG. 10C and thence through conductor 330 to and through cam contacts C3m (FIG. 10D), relay contacts 33Rm and solenoid 138L to negative potential line 254. Energization of solenoid 138L, as previously described, raises the associated idler roll 132 allowing platform 126 to be raised and the card to be stacked in the pocket by feed rolls 92. Stacking in each of the other pockets 12 in the Left group is accomplished in the same manner under control of one of the cam contacts C3b through C3m. The cam contacts associated with a particular pocket are closed when a card being fed into that pocket has been advanced under the associated feed rolls 92. The cards will thus be stacked in the pockets 12 in the manner indicated in the schematic showing of the group after the first sort in FIG. 1A.

In order that the sorting operation be automatically continued by now feeding the cards from the Left group of pockets 12 and directing them into pockets 14 of the Right group according to the data punched in the next higher order column, that is column 4, it is first necessary to energize the Left to Right solenoid 30 associated with the reversible drive mechanism. The circuitry is conditioned to energize this solenoid when the last card is fed out of the last of the group of pockets 14 into which cards had originally been placed. In the present problem the last card to be fed is the card designated 736 in FIG. 1A which was the bottom card placed in the 8 pocket 14. Feeding of this card will restore the contacts in the assembly 146 associated with the 8 pocket 14 to their normal condition shown in FIG. 10A, thereby providing a circuit to energize relay 17R. This circuit extends from line 252 through conductor 258d, contacts 2Ra and 294a now closed, and thence through the c contacts of each of the assemblies 146 associated with pockets 14 in the Right group, to and through relay 17R to line 254. Energization of this relay 17R will close contacts 17Ra to complete a circuit to a timing motor TM. This circuit extends from line 252 through conductor 258d, contacts 2Ra and 17Ra now closed, timing motor TM, and conductor 328 to negative potential line 254. Associated with the timing motor and driven thereby through gearing not shown is a timing cam 294. The gearing is such that cam 294 will be rotated 180 degrees during the time it takes a card to be fed from the extreme pocket of the Right group, the 12 pocket 14, to the extreme pocket of the Left group, the 9 pocket 12. The purpose of this timing motor and cam 294 is to ensure that all of the cards fed from the Right group of pockets 14 are properly stacked in pockets 12 of the Left group before the machine drive is reversed.

After cam 294 is rotated 180 degrees a lobe provided thereon will transfer its associated contacts, opening contacts 294a and closing contacts 294b. The opening of contacts 294a breaks the circuit holding relay 17R energized thereby causing contacts 17Ra to be opened and timing motor TM to be stopped. Cam 294 will be stopped with its high lobe holding the associated contacts in this transferred condition, in which condition, the contacts 294a, being opened, cause Right to Left solenoid 28 to be deenergized; and the contacts 294b, being closed, now complete a circuit to energize Left to Right solenoid 30. This circuit extends in FIG. 10A, from line 252 through contacts 2Ra which remain closed with relay 2R still energized, contacts 294b now closed, and conductor 316 to and through solenoid 30 to line 254. Solenoid 30 will be thus held energized until this second phase of the sorting operation, sorting of the cards from the pockets 12 into the pockets 14 according to the data punched in column 4, is completed and timing motor TM is again started. Energization of solenoid 30 will, as previously described in connection with FIG. 7, reverse the direction of the drive transmitted from motor 16 to the main horizontal shaft 26.

Since the sort problem being considered is numeric this second sorting operation is to be on the data contained in column 4 of the cards. The above mentioned energization of relay 17R also effects the closing of the contacts 17Rb to energize both the column select magnet 272M and the sort control magnet 274M. The circuit extends in FIG. 10E from line 252 through conductor 258i, switch 298 in the N position, contacts 17Rb now closed, contacts 36Ra to and through magnet 272M, and thence through conductor 360 to line 254. A parallel circuit extends from magnet 272M through conductor 356 to and through magnet 274M and thence to line 254. The stepping mechanism for each of the switches 272 and 274 is the same and the attraction of armature 272A will, for example, cause the attached pawl 272P to be moved to the right in FIG. 10E. Another pawl 272B engaging the teeth in ratchet 272R prevents any counterclockwise movement of the unit at this time. However, when magnet 272M is deenergized, as a result of the deenergization of relay 17R opening contacts 17Rb, the armature 272A will be returned to its original position by spring 272S. This movement will through pawl 272P cause the ratchet 272R to be rotated one step in a clockwise direction so that the terminal corresponding to column 4 is now insulated from ring 272a. Each of the photocells 164 of the right row 20 of sensing devices is connected in the circuitry in the same manner as previously explained with reference to those of the left row 18. Thus, with switch 272 in this condition, only the triode associated with the photocell 164, corresponding to column 4 of the cards can be rendered conductive, and the cards will be sorted on column 4 during this Left to Right operation. The energization and deenergization of magnet 274M (FIG. 10F) effects a similar clockwise stepping of unit 274 so that it is now set on the numeral 2 representative of the number of columns still to be sorted.

With shaft 26 being rotated in the proper direction for left to right feeding, the pocket control circuitry is now conditioned for feeding out of the Left group of pockets 12 and into the Right group of pockets 14. Relays 33R and 40R are energized upon the closing of the contacts 294b by a circuit extending from these contacts through the coils of relays 33R and 40R in parallel, and thence through conductor 328 to line 254. The energization of relay 40R closes its associated contacts to condition the machine for Left to Right operation. The transferring of contacts 40Re in FIG. 10E causes the solenoid 171 to now be energized each card cycle under control of cam contacts C6. The right gate 168 is thus raised each card cycle to register the cards 11 with respect to the right row 20 of sensing devices. The transferring of contacts 40Rb (FIG. 10C) now causes the circuitry supplying positive potential to the conductor 336, and thus to the plates 164b of the photocells 164, to be under the control of cam contacts C9, instead of cam contacts C8. Cam contacts C9, as is shown in FIG. 9A, are closed from shortly before 7 time to shortly after 12 time of each card cycle. It is during this portion of a card cycle that the 0 through 9 index point positions, of a card being fed from Left to Right, are presented to the row 20 of sensing devices. The transferring of the 40Rc and 40Rd contacts in FIG. 10F renders the Right to Left sort magnets 224 non-responsive to the photocells 164 in the Left row 18, and renders the Left to Right sort magnets 224 now responsive to the photocells 164 in the left row 20.

The above mentioned energization of relay 33R transfers its contact assemblies 33Rb through 33Rn, one of which is connected in the circuitry of each of the boxes Kb through Kn, to now place the solenoids 138R of the Right group of pockets 14 under control of the cam contacts C3b through C3n. These cam contacts are, as previously described, closed and opened to energize the associated solenoids 138R at the proper times in each card cycle to effect stacking of the cards in pockets 14.

In a manner similar to that described for feeding from the Right group of pockets 14, feeding from the Left pockets 12 is accomplished under the control of the contacts in the assemblies 146 associated with these pockets. As shown in FIG. 1A, the pocket, nearest the sensing station, into which a card was stacked is the 4 pocket 12 which contains the card designated 944. The contacts in the assembly 146 associated with this pocket are now in the transferred condition allowing a circuit to be completed from line 252 through conductor 258d (FIG. 10A), contacts 2Ra and 294b now closed, the normally closed d contacts of the assemblies 146 associated with the R, 12, 11, 0, 1, 2 and 3 pockets 12, and the now closed b contacts of the assembly 146 associated with the 4 pocket 12 to and through the coil relay L4 to line 254. Energization of this relay will close associated contacts L4a (not shown) which are connected in the circuitry here represented by the box Ki. This circuitry controls feeding from the 4 pocket 12 of the Left group and the 3 pocket 14 of the Right group. Though not shown in detail this circuitry is similar to that shown for the R pockets of each group and causes energization of a relay 132 (not shown) to place the solenoid 138L associated with the 4 pocket 12 under control of cam contacts C1i and C2i. This solenoid will be energized under control of these cam contacts, the timing of which is shown in FIG. 9, so that the card designated 944 will be fed from the pocket to arrive at the gate 168 at 14 time of a card feed cycle. The restoration of the contacts 146 upon feeding of this card from the 4 pocket 12 will now allow a circuit to be completed through the transferred b contacts of the assembly 146 associated with the 5 pocket 12 to energize relay L5. Energization of this relay will, in a manner similar to that above described, condition the machine for feeding out of the 5 pocket 12. The single card designated 735, shown in FIG. 1A to be in this pocket, is fed therefrom. The resulting restoration of the contacts in the assembly 146 associated with the 5 pocket 12 allows the relay L6 to be energized by a circuit through the transferred *b* contacts of the assembly 146 associated with the 6 pocket 12. This operation continues until all of the cards fed into the Left group of pockets 12 have been fed therefrom, in succession, to be registered by gate 168 and thence advanced past the right now 20 of sensing devices.

As above explained, only the photocell associated with column 4 is now responsive to actuate the Left to Right sort magnets 224. The first card fed during this operation is the card designated 944 in FIG. 1A. At 3 time of the card cycle during which this card is fed past the sensing devices the photocell 164 corresponding to column 4 will be rendered more conductive. Note should be made of the fact that it is at 3 time of a card cycle that the 4 index point positions of a card being fed left to right are presented to the right row 20 of sensing devices. Since, as before, relay 34R will have been energized by the closing of card lever contacts 206, a circuit is now available from line 252 to the plate 164*b* of this photocell. This circuit extends in FIG. 10C from line 252 through conductor 258*e*, switch 298 in the N position, contacts 40R*b* now transferred, cam contacts C9, contacts 34R*a* now closed, conductor 402, commutator contacts 288*a*, and conductor 336, to the plates 164*b* of the photocells 164. Since the photocell corresponding to column 4 is now more conductive, an increased current flows from the plate of this photocell to its cathode and thence through resistors 164*c*, 164*d* and 164*e* to negative potential terminal 370. The potential at the junction 374 is thereby raised to raise the grid 282*a* of the associated triode 282 above the cut off potential and render the tube conductive. A circuit is then available from ground potential terminal 376 (FIG. 10E) through conductor 340, the cathode 282*b* and anode 282*c* of the triode, to and through the Left to Right sort magnets 224, and thence through contacts 40R*c* now transferred, relay 35R and conductor 334 to line 252. Left to Right magnets 224 and relay 35R will be held energized for the remainder of the card cycle by a circuit extending from line 254 through conductor 340, contacts 35R*a* now closed, cam contacts C5, relay contacts 40R*d* now transferred to Left to Right sort magnets 224 and thence, as above, through these magnets and relay 35R to line 252. The chute blades 24 associated with these sorting magnets will be actuated in the same manner as was described with reference to the chute blades 24 associated with Right to Left sort magnets 224. The first card is thus directed into the 4 pocket 14 of the Right group and each of the succeeding cards is similarly sensed and directed into the appropriate pocket until this operation is completed. Upon completion of the operation the position of the cards will be as shown for after the second sort in FIG. 1A.

The last card fed during the above described Left to Right operation is the card designated 859 which card, as shown in FIG. 1A, was the bottom card in the 9 pocket 12 at the beginning of the second sort. Feeding of this card from the 9 pocket restored the associated contacts 146 to make available a circuit to energize relay 31R and thereby condition the circuitry for the change from Left to Right to Right to Left operation. This circuit extends in FIG. 10A from line 252 through conductor 258*d*, contacts 2R*a* and 294*b* now closed, and the *d* contacts of the assemblies 146 for each of the pockets 12 in the Left group to and through relay 31R to line 254. Energization of relay 31R closes contacts 31R*a* to complete a circuit from line 252 through these contacts and timing motor TM to line 254. As before explained, timing motor TM will rotate cam 294 180 degrees in the time needed to allow all cards fed from the Left pockets 12 to be properly stacked in the Right pockets 14. At this time the low portion of the cam will allow the cam follower to transfer the contact to the position shown in FIG. 10A with contacts 294*a* closed and contacts 294*b* open. The opening of contacts 294*b* will cause relays 33R and 40R to be deenergized thereby restoring their contacts to the proper condition for Right to Left operation. The opening of contacts 294*b* will also cause Left to Right solenoid 30 to be deenergized and the closing of contacts 294*a* will, through a circuit previously described, cause the Right to Left solenoid 28 to be energized to thereby reverse the direction of rotation of main horizontal shaft 26. The opening of contacts 294*b* will also cause relay 31R to be deenergized and the contacts 31R*a* to be restored to their normal open position. However, while relay 31R is being held energized, a circuit is available to energize the column select magnet 272M and the sort control magnet 274M. This circuit extends in FIG. 10E from the line 252 through conductor 258*j*, contacts 31R*b* now closed, the normally closed contacts 36R*a* and thence through these magnets in parallel to line 254. The deenergization of the relay 31R and opening of its contacts 31R*b* will deenergize these magnets and this deenergization will in a manner previously described cause each of the switches to be stepped one step in a clockwise direction. The switch 274 will thus be set for 1 representative of the single column of information still to be sorted, and switch 272 set on column 3 which is the column to be sorted on during the Right to Left operation about to take place.

This last stepping of the sort control switch 274 to column 1 will, as shown in FIG. 10F, cause a lobe 274L to raise the actuator 296*a* of a pair of switch contacts 296 thereby closing these contacts. Closing of these contacts completes a circuit to energize and hold energizer relay 36R, which circuit extends from line 254 through the coil of the relay, contacts 296, conductor 358, and relay contacts R2*b* now closed to line 252. Energization of relay 36R signifies that the sort now being accomplished is on the last column of the field and, in a manner later to be described, conditions the machine to stop after the final sort required is completed. Where the field contains an even number of columns the operation is complete after the sort on the last column, but where, as in the present problem, the field contains an odd number of columns an extra run of the cards is required before the sorting operation is complete.

The second Right to Left operation is now accomplished in the same manner as described in connection with the first sort. Referring to FIG. 1A, cards are first fed out of the 7 pocket 14 and then out of the succeeding pockets under control of the contact assemblies 146. The cards are registered at the sensing station by gate 166, and are then sensed and directed into the pockets 12 of the Left group according to the information contained in column 3. At the end of this sort operation the cards will be in the position shown for after the third sort in FIG. 1A.

It should be noted that the cards might now be removed and placed in sequential order by first removing the cards from the 9 pocket and then from each of the succeeding pockets in order and placing the card or cards taken from each pocket on top of those taken from the preceding pocket. However, since the cards are originally placed in the machine, face down, the cards, if removed in this manner and turned face up, will actually be arranged with the highest card on top and the others following in descending order. In order to place the cards in the usually desired ascending order, the machine, herein disclosed as a preferred embodiment of the invention, is designed to automatically resort the cards on the same column and thereby group the cards in the right pockets 14 in the position shown after the fourth sort. FIG. 1A also illustrates that when the sorting field contains an even number of columns, no extra run of the cards is required.

There it may be seen that the cards in the right pockets 14, in the position shown after the second sort are the proper order to be removed is ascending sequence according to the numeric information contained in columns 4 and 5 of the cards.

As the last card, which is the card designated 327, is fed from the 2 pocket 14 during the second Right to Left operation above described, the contacts in the assembly 146 associated with that pocket will be restored to their normal condition. A circuit is then available as previously described to energize relay 17R, thereby closing contacts 17Ra to complete a circuit to timing motor TM. The resulting transfer of contacts 294a causes Right to Left solenoid 28 to be deenergized. The coincident transfer of contacts 294b causes the Left to Right solenoid 30 and relays 33R and 40R to be energized anticipatory of the Left to Right operation to follow. Since relay 36R is now energized and contacts 36Ra (FIG. 10E) are thus now open, the energization and deenergization of relay 17R will not, as before, cause a circuit to be completed to the column select magnet 272M and the sort control magnet 274M. The switches 272 and 274 will thus remain in the same condition, so that, on the Left to Right operation to follow, the photocell 164 corresponding to column 3 in the right row 20 will be responsive to control the Left to Right sorting magnets 224. Thus, after the completion of the Right to Left sort on column 3, the circuitry will control the machine in a manner above described to feed the cards from the Left group of pockets 12, sense the data in column 3 of each card, and direct the cards into the pockets 14 of the Right group according to the data sensed. After completion of this operation the cards will be in the position shown after the fourth sort in FIG. 1A.

Since the above described Left to Right operation is the last operation required, the machine must be stopped after its completion so that the cards may be removed from the pockets 14. The circuitry is conditioned to stop the machine when, at the end of this Left to Right operation, relay 31R is energized to start timing motor TM. Cam 294 is then rotated so that it reaches the position shown in FIG. 10A after the last card is properly stacked in the appropriate pocket 14. With the cam in this condition contacts 294a are closed, thereby completing the previously described energizing circuit to the Right to Left solenoid 28. Since relay 36R is now being held energized, the contacts 36Rb are now closed and a parallel circuit extends in FIG. 10B from solenoid 28 through these contacts to and through relay 3R. The energization of relay 3R opens the contacts 3Ra thereby opening the hold circuit to relay 1R. Relay 1R is thus deenergized, opening its contacts 1Ra to thereby break the energizing circuit to drive motor 16 and relay 2R. Drive motor 16 will thus cease to drive the shaft 26 and the deenergization of relay 2R will open contacts 2Ra (FIG. 10A) and 2Rb (FIG. 10E), thereby deenergizing relays 36R and 3R so that upon completion of the sorting operation the machine circuitry is in the same condition as at the beginning of the sorting operation. The cards 11 in the right pockets 14 may be removed and a new group placed therein and switches 272 and 274 properly set for another sorting operation which will be initiated as before by the depression of start key 256 in FIG. 10A.

It has been previously mentioned that, where the sorting field contains an even number of columns, no resorting on the last column of the field is necessary. The machine will be then automatically stopped with the cards in the proper pockets 14 of the right group after the sort of the last column of the field. Stopping of the machine is under the control of switch 274 and this switch will always be stepped to a setting of 1 at the initiation of sorting on the last column of the field. With the switch at this setting the contacts 296 are closed to thereby energize 36R. When the field being sorted contains an even number of columns, this sort on the last column will always be a Left to Right operation. At the end of each Left to Right operation, the cam contacts 294a (FIG. 10A) are closed to complete the energizing circuits to Right and Left solenoid 28 anticipatory of the next operation. However, since contacts 36Ra are then closed, relay 3R will be energized and the machine stopped as described above.

*Alphabetic sorting.*—Alphabetic information is punched in the well-known type IBM cards, utilized with the preferred embodiment of the machine herein described, in combinational form. Each letter of the alphabet is represented by a single perforation in a zone field, which comprises index positions 12, 11 and 0, in combination with a single perforation in a numeric field which comprises index point positions 1 through 9. The combinations are illustrated on the card shown in FIG. 8, the letter A for example being represented by a 12 and a 1 perforation in the same column, the letter B by a 12 and a 2 perforation, etc. In order to properly arrange cards according to alphabetic information contained therein, it is necessary to sort the cards twice on each column. During the first sort, which is as before a Right to Left operation, the cards are arranged in the 1 through 9 pockets 12 of the Left group according to the perforations contained in the numeric field of the column being sorted. During the second sort the cards are arranged in the 12, 11 and 0 pockets 14 of the Right group according to the perforations contained in the zone field of this same column. Since two sorts are required for each column, the cards will be always in the proper sequence in the Right group of pockets 14 at the completion of sorting a field of information, regardless of the number of columns in the field. When the sorting operation is completed with the cards in the Right group of pockets 14, the machine will be stopped in the manner previously described with reference to numeric sorting by circuitry under control of the contacts 296 associated with switch 274 (FIG. 10F).

In setting up the machine to acomplish an alphabetic sort, the same procedure as before explained with reference to numeric sorting is followed with the single exception that the switch 298 (FIGS. 10C and 10E) is set to the A position. Card feeding, card registering and card stacking are accomplished in the same manner as above described with reference to numeric sorting. In order that the cards might be sensed only at the index point positions 9 through 1, instead of 9 through 0, during the first sort, it is necessary that the conductor 336 (FIGS. 10E and 10F), which is connected to the plates 164b of each of the photocells 164, be raised in potential only from 9 through 1 time of a card cycle. During numeric operation the potential of this conductor 336 was raised during Right to Left operation under the control of cam contacts C8 which contacts are closed from 9 through 0 time of each card cycle. With switch 298 (FIG. 10C) now in the A position, the circuit to conductor 336 extends from line 252 through conductor 258e, switch 298 in the A position, relay contacts 40Rf which are in the position shown during a Right to Left operation, cam contacts C10, relay contacts 34Ra closed as before under control of card lever 206, conductor 402, and commutator cam contacts 288a to conductor 336. Cam contacts C10 are, as shown in FIG. 9A, closed from shortly before 9 time to shortly after 1 time, thus ensuring that only information contained in the numeric field of the cards will be effective to cause energization of the Right to Left sort magnets 224. During the subsequent Left to Right operation, the relay 40R will be energized, thereby transferring contacts 40Rf so that the circuit to conductor 336 then extends in FIG. 10C through the cam contacts C11. These contacts are closed from shortly before 9 time to shortly after 7 time each cycle, during which time, as shown in FIG. 9A, the 12, 11 and 0 index point positions of cards being fed Left to Right are presented to the row 20 of sensing devices. Thus, during the second sort, which is a Left to Right operation on the same column, the cards will be directed into the 12, 11 or 0 pockets 14 according to the information contained in the zone field of the particular column.

During numeric sorting, as has been previously described, the switches 272 and 274 are stepped after each operation. In order that the machine may now sort on each column twice, it is now necessary that these switches be advanced only after each Left to Right operation. After a Right to Left operation with the switch 298 (FIG. 10E) set on N for numeric sorting, the energizing circuit to the switch magnets 272M and 274M extended from line 252 through conductor 258i, the switch 298 in the N position, contacts 17Rb closed by the energization of relay 17R at the completion of each Right to Left operation, and thence through contacts 36Ra to and through the switch magnets. With switch 298 in the A position for alphabetic sorting this circuit is not available and the magnets 272M and 274M will not be energized after a Right to Left operation. However, the circuit available to these magnets after a Left to Right operation is the same as previously described, extending from line 252 through conductor 258j, contacts 31Rb closed after a Left to Right operation, and contacts 36Ra to and through magnets 272M and 274M to line 254.

The alphabetic sorting operation is otherwise the same as that described for numeric sorting, the gates 166 and 168 registering the cards fed and chute blades 24 directing the cards into the proper pockets according to the information sensed. When the sorting operation is complete with all of the cards in the pockets 14 of the Right group, the machine will be automatically stopped, in the manner previously described, by the circuitry under the control of the contacts 296 operated by the sort control switch 274.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a record card machine, a first group of card pockets, a second group of card pockets, reversible means operable to feed cards bearing indicia out of pockets in said first group and into pockets in said second group, means intermediate said first and second groups of pockets for sensing indicia in the cards being fed from said first group, means actuable by said sensing means for selectively directing the cards into the pockets of said second group according to the indicia sensed, and detecting means associated with the pockets of said first and second groups and effective when all the cards have been fed from said pockets in said first group to reverse said feed means and thereby render said means operable to feed the cards out of the pockets in said second group in a predetermined sequence and into the pockets in said first group.

2. In a record card machine, a sensing station, a first row of card pockets located on one side of said sensing station, a second row of card pockets located on the other side of said sensing station, controllable mechanism operable to first feed cards out of the successive pockets in said first row through said sensing station and into selected pockets in said second row, means including a delay device operable to control said feed mechanism, and means associated with the pockets in said first group for detecting when the last card has been fed therefrom, said control means being operable by said detecting means and when thus operated being effective after said last card has been fed into a pocket in said second row to control said feed mechanism to feed the cards out of the successive pockets in said second row and into selected pockets in said first row.

3. In a record card machine, a first group of card pockets, a second group of card pockets, the pockets in each group being adapted so that cards might be fed out of the pockets in either group and into the pockets of the other group, means for initiating a succession of machine operations, means operable during the first of said operations and alternate operations thereafter to feed a plurality of cards bearing multi-order data out of the pockets in said first group and into the pockets in said second group, and operable during the second of said operations and alternate operations thereafter to feed said records out of the pockets in said second group and into the pockets in said first group, means intermediate said first and second groups of pockets for selectively sensing single orders of data in said cards during each of said succession of machine operations, means controllable by said sensing means sensing data in said cards fed from pockets in either of said groups for selectively directing the sensed cards into pockets in the other of said groups according to the data sensed; and means, including card detecting means associated with each of said pockets, for controlling said feed means to feed the cards out of the pockets in a predetermined order during each of said machine operations.

4. In a machine for sorting records each bearing data recorded in combinational form in a plurality of fields, a first group of record pockets, a second group of record pockets, a sensing station intermediate said first and second groups of card pockets and fixedly mounted with respect thereto, means for initiating a succession of machine operations, means operable during the first of said operations and alternate operations thereafter to feed a plurality of said records out of the pockets in said first group through said sensing station in a first direction and into the pockets in said second group, and operable during the second of said operations and alternate operations thereafter to feed said records out of the pockets in said second group through said sensing station in an opposite direction and into the pockets in said first group, controllable means at said sensing station for sensing data in the records fed during each of said succession of machine operations, means for controlling said sensing means during the first and alternate operations thereafter to sense data recorded in one of the plurality of fields on said records and during the second and alternate operations thereafter to sense data recorded in another of the plurality of fields on said records, and means controllable by said sensing means sensing data in cards fed from either of said groups for selectively directing the sensed cards into pockets in the other of said groups according to the data sensed.

5. In a machine for arranging a plurality of cards in an order sequential with respect to multi-order data recorded in a plurality of columns on each card, in combination, a first group of card pockets, a second group of card pockets, a sensing station mounted intermediate said first and second groups of card pockets, means for initiating a succession of machine operations, means operable during the first of said operations and alternate operations thereafter to feed said cards out of the pockets in said first group through said sensing station in a first direction and into the pockets in said second group, and operable during the second of said operations and alternate operations thereafter to feed said cards out of the pockets in said second group through said sensing station in an opposite direction and into the pockets in said first group, means at said sensing station controllable to sense data in the columns of said cards during each of said succession of operations, means controllable by said sensing means sensing data in said cards fed from pockets in either of said groups for selectively directing the sensed cards into pockets of the other group according to the data sensed, first means settable to control said sensing means to sense data in a particular column of said cards during the first of said succession of operations, means controllable after each of said operations for resetting said first settable means to control said sensing means to sense a different column on said record during the succeeding operation, and second means settable to control said resetting means.

6. In a machine for arranging a plurality of cards in an order sequential with respect to multi-order data recorded in a plurality of columns on each card, in combination, a first group of card pockets, a second group of card pockets, means for initiating a succession of machine operations, means operable during the first of said operations and alternate operations thereafter to feed said cards in a first direction out of the pockets in said first group and into the pockets in said second group, and operable during the second of said operations and alternate operations thereafter to feed said cards in an opposite direction out of the pockets in said second group and into the pockets in said first group, means intermediate said first and second groups of pockets for sensing cards fed in either said first or said opposite direction and controllable to sense data in the columns of said cards during each of said succession of operations, means controllable by said sensing means sensing data in said cards fed from pockets in either of said groups for selectively directing the sensed cards into pockets of the other grop according to the data sensed, settable means for controlling said sensing means to sense data in a particular one of said plurality of columns during the first of said succession of operations, and means operable between successive ones of said operations for setting said control means to control said sensing means to sense data in a different column on said records during the next succeeding operation.

7. In a card machine, a sensing station, a first group of card pockets, a second group of card pockets, said card pockets being mounted in positions fixed with respect to said sensing station means operable to feed cards out of pockets in either of said groups through said sensing station and into pockets in the other of said groups, first sensing means at said sensing station for sensing indicia in cards fed from pockets in said first group; first guide means controllable by said first sensing means to guide cards fed out of pockets in said first group into pockets in said second group according to the indicia sensed, second sensing means at said sensing station for sensing indicia in cards fed from said second group of pockets, and second guide means controllable by said second sensing means to guide cards fed out of pockets in said second group into pockets in said first group according to the indicia sensed.

8. In a record card machine, two groups of card pockets, a sensing station, means operable to convey cards from either of said groups of card pockets through said sensing station to the other of said groups of said pockets, an individual feed mechanism associated with each pocket in each of said groups, each of said feed mechanisms being controllable to assume either of two operating conditions and effective in the first of said conditions to feed cards out of the associated pocket to said conveying means and effective in the second of said conditions to receive cards fed from said conveying means and stack them in the associated pocket, control means for controlling the feed mechanisms associated with pockets in one of said groups to be in said second operating condition when a feed mechanism associated with a pocket in the other of said groups is in said first operating conditions, and means for controlling said feed mechanisms associated with said pockets in said other group to assume said operating conditions in a predetermined order.

9. In a machine for arranging in sequential order a plurality of records placed randomly in different ones of a first row of pockets, a second row of pockets, a sensing station intermediate said first and said second row of pockets, means for initiating a first succession of feed cycles, first feed means operable during each of said first succession of feed cycles to feed a card out of one of said pockets in said first row into which cards have been placed, first control means including card detecting means associated with said pockets for controlling said first feed means to feed the cards out of said pockets in succession, said first control means being effective on the next feed cycle after the one during which the last card is fed out of one of said pockets to control said feed means to feed the first card out of the next pocket in the row into which cards have been placed, reversible means for conveying said cards fed out of said first row of pockets through said sensing station in a first direction and into different ones of said pockets in said second row, said first control means being effective after the last of said plurality of cards is conveyed to a pocket in said second row to reverse said conveying means and to initiate a second succession of feed cycles, and second feed means effective during each of said second succession of feed cycles to feed a card out of one of the pockets in said second row into which cards have been conveyed, said conveying means being then effective to feed said cards through said sensing station in a direction opposite said first direction and into different ones of the pockets in said first row.

10. In a machine for arranging in sequential order a plurality of cards bearing multi-order data, a first group of pockets adapted to receive the cards to be arranged, a second group of pockets, a sensing station intermediate said groups of pockets, controllable feed means operable to feed said cards back and forth through said sensing station between said groups of pockets, controllable sensing means at said sensing station for sensing a single order of data in said cards each time they are fed from one of said groups of pockets to the other group, means controlled by said sensing means for directing cards fed from either group of pockets into pockets in the other group according to the data sensed, means for controlling said sensing means to sense the lowest order of data in said cards when they are first fed past said sensing means and to sense a succeeding order of data each successive time they are fed past said sensing means, settable means for controlling said feed means to feed said cards back and forth between said pockets until the cards have been directed into pockets in one of said groups of pockets according to the highest order data in said cards, and further means effective when said cards have been directed into said second group of pockets according to the highest order of data on said records for controlling said feed means to feed said cards back to said first group of pockets.

11. In a record card machine, a first group of card pockets, a second group of card pockets, means operable to first feed record cards bearing indicia out of the pockets in said first group and in a first direction along a record card path to the pockets in said second group, and then to feed said record cards out of the pockets in said second group and in an opposite direction along said record card path to the pockets in said first group, means mounted adjacent said record card path intermediate said first and second groups of pockets for sensing indicia in said record cards fed in either direction from pockets in one of said groups to pockets in the other group, and means actuable by said sensing means for selectively directing said record cards fed into the pockets of the other group according to the indicia sensed.

12. In a record card machine, two groups of card pockets, feeding means controllable to feed cards bearing indicia back and forth between said groups of pockets, means for sensing indicia in cards fed from either of said groups of pockets, means actuable by said sensing means for selectively directing said cards into pockets of the other group according to the indicia sensed, and means including card detecting means associated with each of said pockets for controlling said feeding means to feed cards out of selected ones of said pockets in a predetermined order.

13. In a record card machine, a first group of card pockets, a second group of card pockets, reversible mechanism controllable to be effective to feed cards out of any pocket in said first group of pockets into any pocket in said second group of pockets, means for reversing said feed mechanism to render it effective to then feed said cards out of the pockets in said second group and into any pocket in said first group, and means including card detecting means associated with each of said pockets for controlling said feed mechanism to feed cards out of selected ones of said pockets in a predetermined sequence.

References Cited in the file of this patent

UNITED STATES PATENTS

| | | |
|---|---|---|
| 2,265,441 | Maul | Dec. 9, 1941 |
| 2,795,328 | Tyler | June 11, 1957 |